(12) United States Patent
Sugimoto

(10) Patent No.: US 10,504,247 B2
(45) Date of Patent: Dec. 10, 2019

(54) TRANSMISSION APPARATUS, MIXED REALITY SYSTEM, TRANSMISSION METHOD, AND PROGRAM

(71) Applicant: CANON KABUSHIKI KAISHA, Tokyo (JP)

(72) Inventor: Shun Sugimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 15/548,176

(22) PCT Filed: Mar. 30, 2016

(86) PCT No.: PCT/JP2016/001832
§ 371 (c)(1),
(2) Date: Aug. 2, 2017

(87) PCT Pub. No.: WO2016/170740
PCT Pub. Date: Oct. 27, 2016

(65) Prior Publication Data
US 2018/0033163 A1    Feb. 1, 2018

(30) Foreign Application Priority Data

Apr. 23, 2015   (JP) .................................. 2015-088770

(51) Int. Cl.
*G06T 9/00* (2006.01)
*H04N 21/24* (2011.01)
(Continued)

(52) U.S. Cl.
CPC ............ *G06T 9/00* (2013.01); *G02B 27/0172* (2013.01); *G06F 3/147* (2013.01); *G06T 7/74* (2017.01);
(Continued)

(58) Field of Classification Search
CPC ........... G06T 9/00; G06T 7/74; G06T 19/006; G06T 2207/30244; G02B 27/0172;
(Continued)

(56) References Cited

U.S. PATENT DOCUMENTS

| 2014/0049636 | A1* | 2/2014 | O'Donnell | G08C 17/02 |
| | | | | 348/143 |
| 2014/0160164 | A1* | 6/2014 | Tsujimoto | H04N 7/18 |
| | | | | 345/633 |
| 2015/0332500 | A1* | 11/2015 | France | G01S 19/51 |
| | | | | 345/633 |

FOREIGN PATENT DOCUMENTS

| JP | H07-203053 A | 8/1995 |
| JP | 2002-320209 A | 10/2002 |

(Continued)

OTHER PUBLICATIONS

International Search Report dated Jun. 7, 2016, in International Application No. PCT/JP2016/001832.

*Primary Examiner* — Jared Walker
(74) *Attorney, Agent, or Firm* — Venable LLP

(57) ABSTRACT

A transmission apparatus transmits, to a reception apparatus, first video captured by an imaging apparatus and second video captured to detect a position and orientation of the imaging apparatus when capturing the first video, and includes a memory containing instructions, and at least one processor for executing the instructions. The instructions are executed to operate as a control unit to control transmission rates of the first and second videos so that a transmission rate ratio between the first video and the second video changes, and a transmission unit to transmit the first video and the second video to the reception apparatus in accordance with the controlled transmission rates. The control unit further controls the transmission rates of the first video and the second video so that the transmission rate of the second (Continued)

video decreases if a communication bandwidth between the transmission apparatus and the reception apparatus decreases.

15 Claims, 18 Drawing Sheets

(51) Int. Cl.
| | | |
|---|---|---|
| *H04N 21/41* | (2011.01) | |
| *H04N 21/6332* | (2011.01) | |
| *H04N 21/4143* | (2011.01) | |
| *H04N 21/4223* | (2011.01) | |
| *H04N 21/431* | (2011.01) | |
| *H04N 21/658* | (2011.01) | |
| *G06F 3/147* | (2006.01) | |
| *G09G 3/00* | (2006.01) | |
| *H04N 19/115* | (2014.01) | |
| *H04N 19/136* | (2014.01) | |
| *H04N 19/179* | (2014.01) | |
| *G06T 7/73* | (2017.01) | |
| *G02B 27/01* | (2006.01) | |
| *G06T 19/00* | (2011.01) | |
| *H04L 29/06* | (2006.01) | |
| *H04N 21/2662* | (2011.01) | |

(52) U.S. Cl.
CPC ........... *G06T 19/006* (2013.01); *G09G 3/001* (2013.01); *H04L 65/80* (2013.01); *H04N 19/115* (2014.11); *H04N 19/136* (2014.11); *H04N 19/179* (2014.11); *H04N 21/2408* (2013.01); *H04N 21/2662* (2013.01); *H04N 21/4122* (2013.01); *H04N 21/4143* (2013.01); *H04N 21/4223* (2013.01); *H04N 21/4318* (2013.01); *H04N 21/6332* (2013.01); *H04N 21/6582* (2013.01); *G02B 2027/014* (2013.01); *G02B 2027/0138* (2013.01); *G06T 2207/30244* (2013.01); *G09G 2340/02* (2013.01); *G09G 2340/0407* (2013.01); *G09G 2370/10* (2013.01); *G09G 2370/16* (2013.01)

(58) Field of Classification Search
CPC ...... G02B 2027/014; G02B 2027/0138; H04N 19/115; H04N 19/136; H04N 19/179; H04N 21/2662; H04N 21/2408; H04N 21/4122; H04N 21/4143; H04N 21/4223; H04N 21/6582; H04N 21/6332; H04N 21/4318; H04L 65/80; G06F 3/147; G09G 3/001; G09G 2340/02; G09G 2340/0407; G09G 2370/10; G09G 2370/16
USPC .................................... 375/240.02
See application file for complete search history.

(56) References Cited

FOREIGN PATENT DOCUMENTS

| | | |
|---|---|---|
| JP | 2004-205711 A | 7/2004 |
| JP | 2004-350227 A | 12/2004 |
| JP | 2006-128997 A | 5/2006 |

* cited by examiner

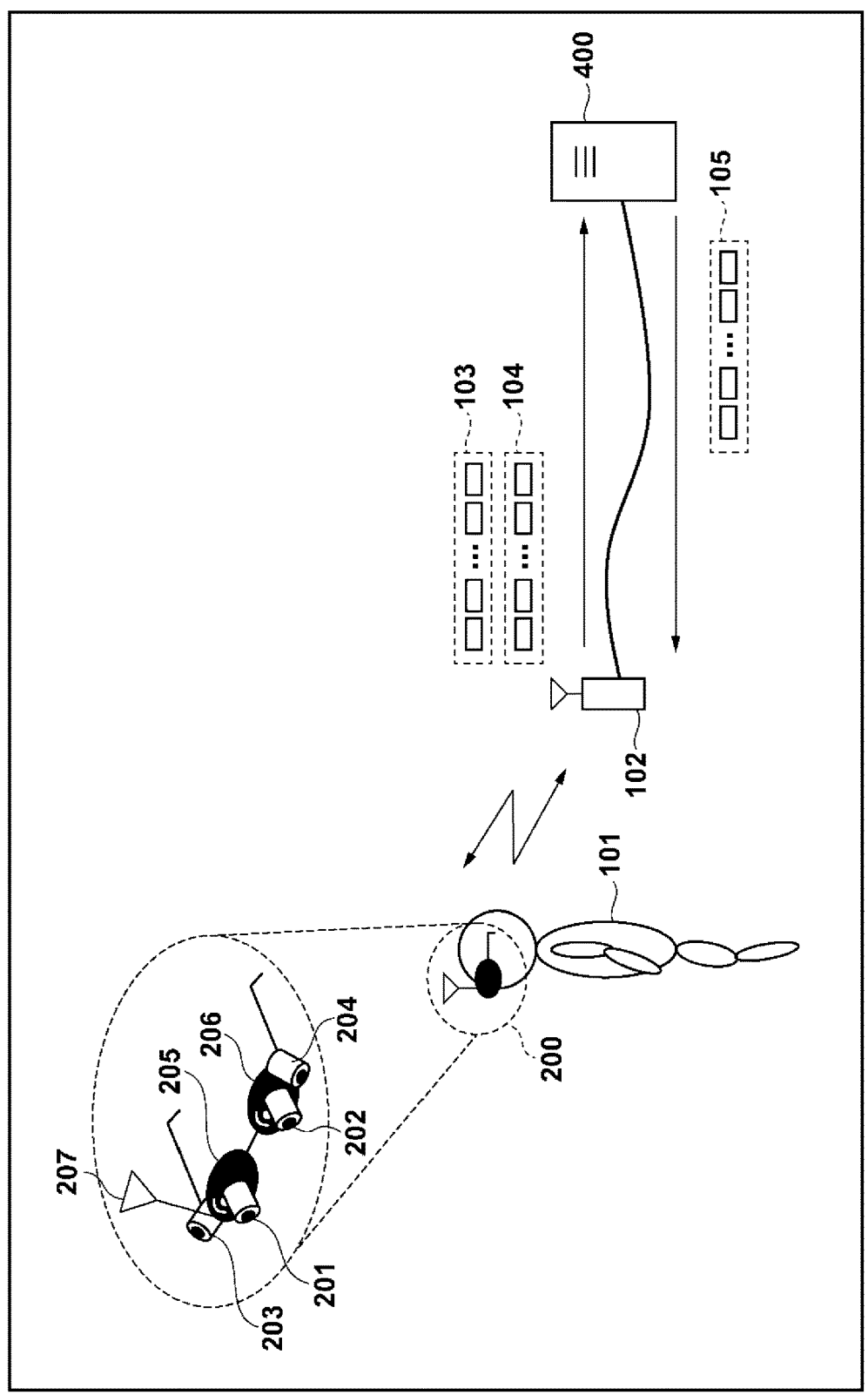
[Fig. 1]

[Fig. 2]
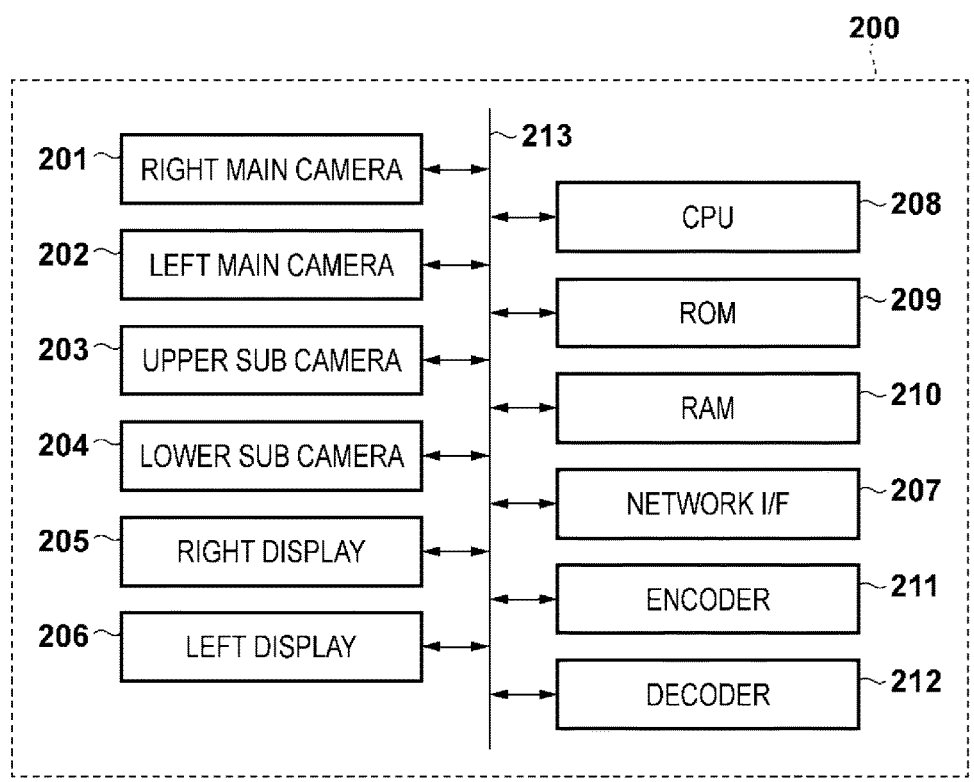

[Fig. 3]
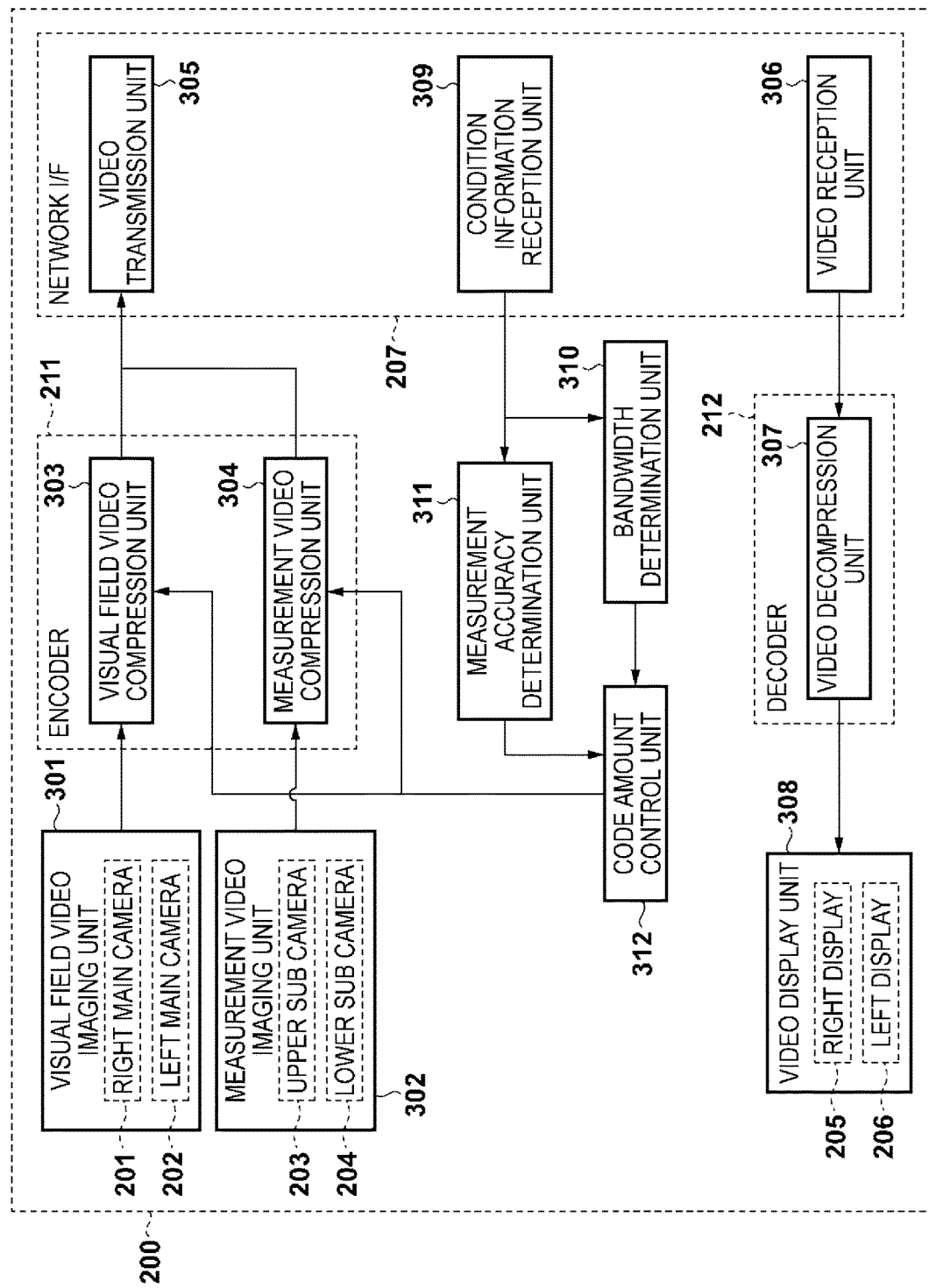

[Fig. 4]
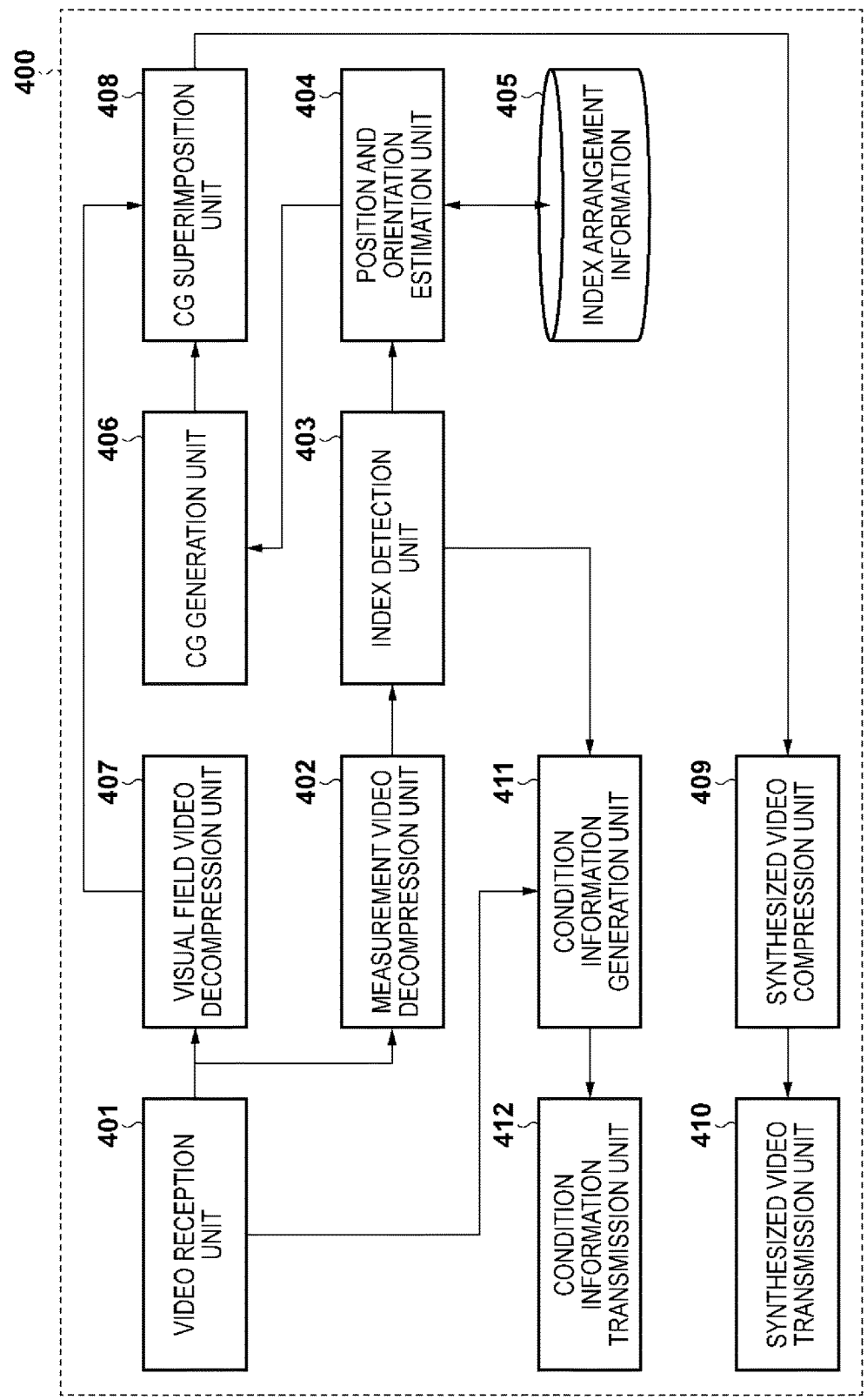

[Fig. 5]
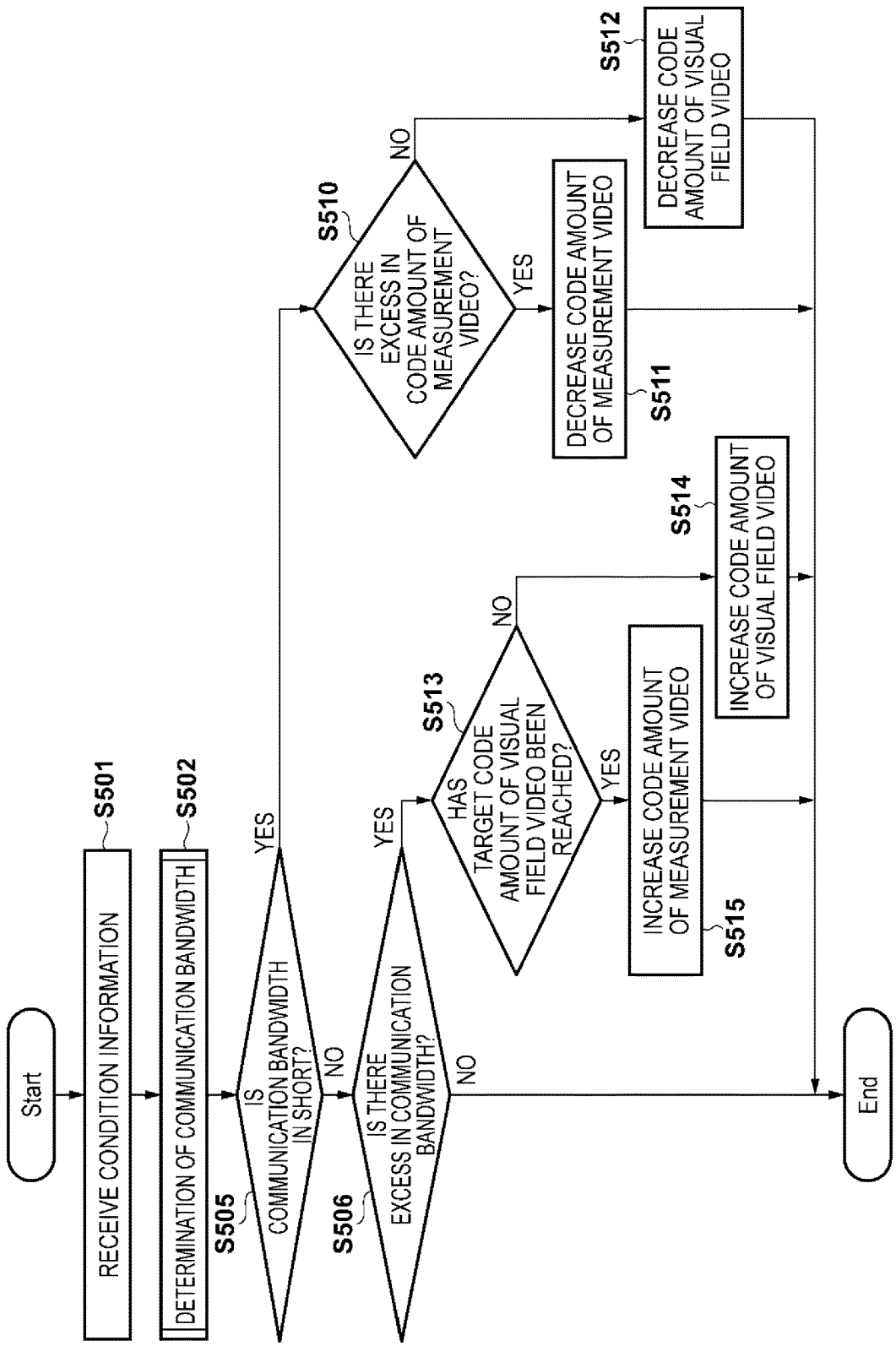

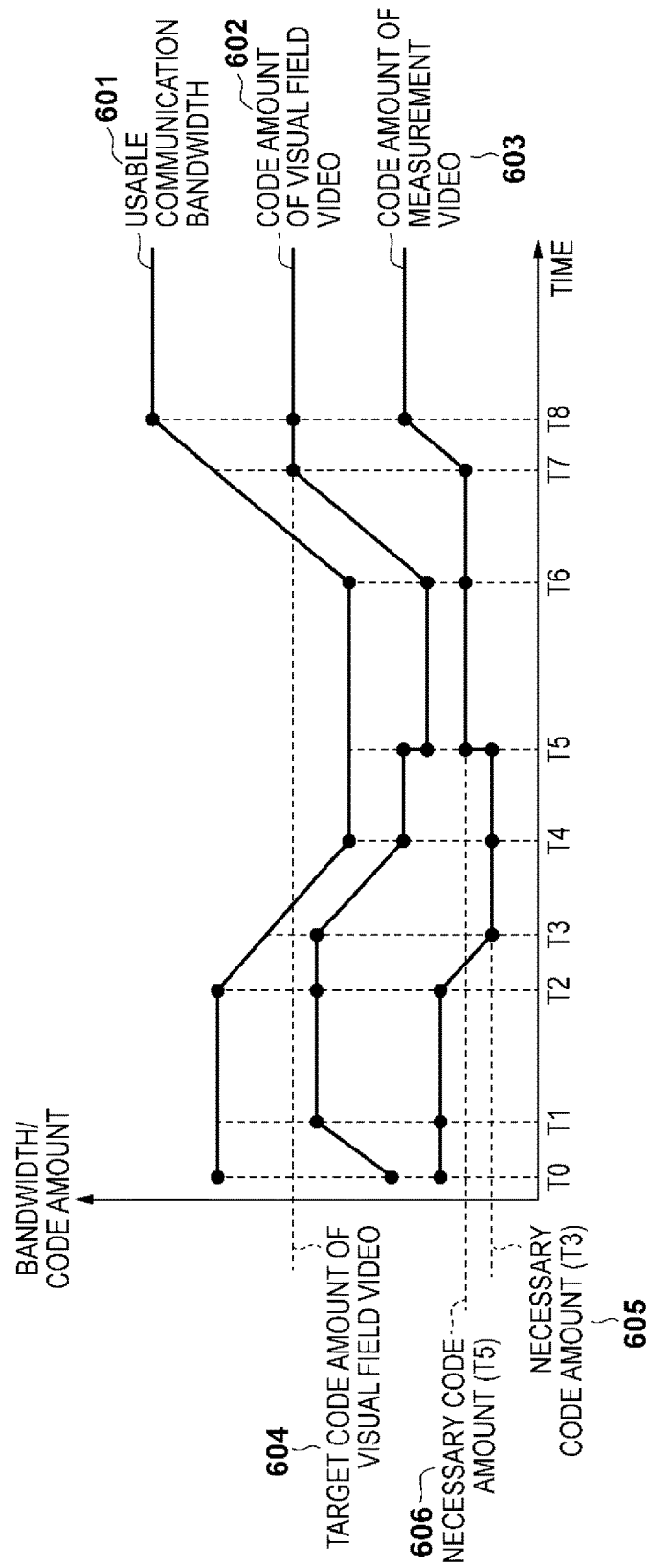

[Fig. 7]
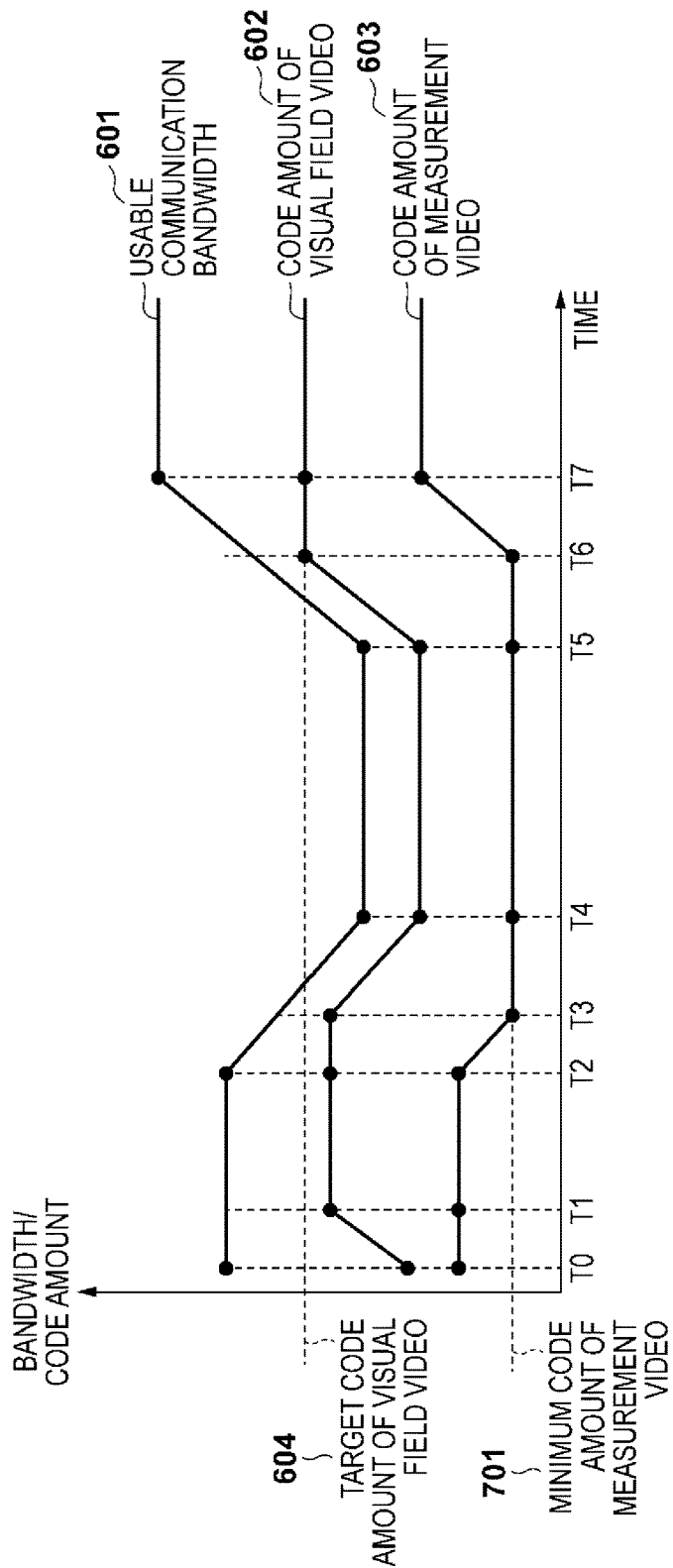

[Fig. 8A]
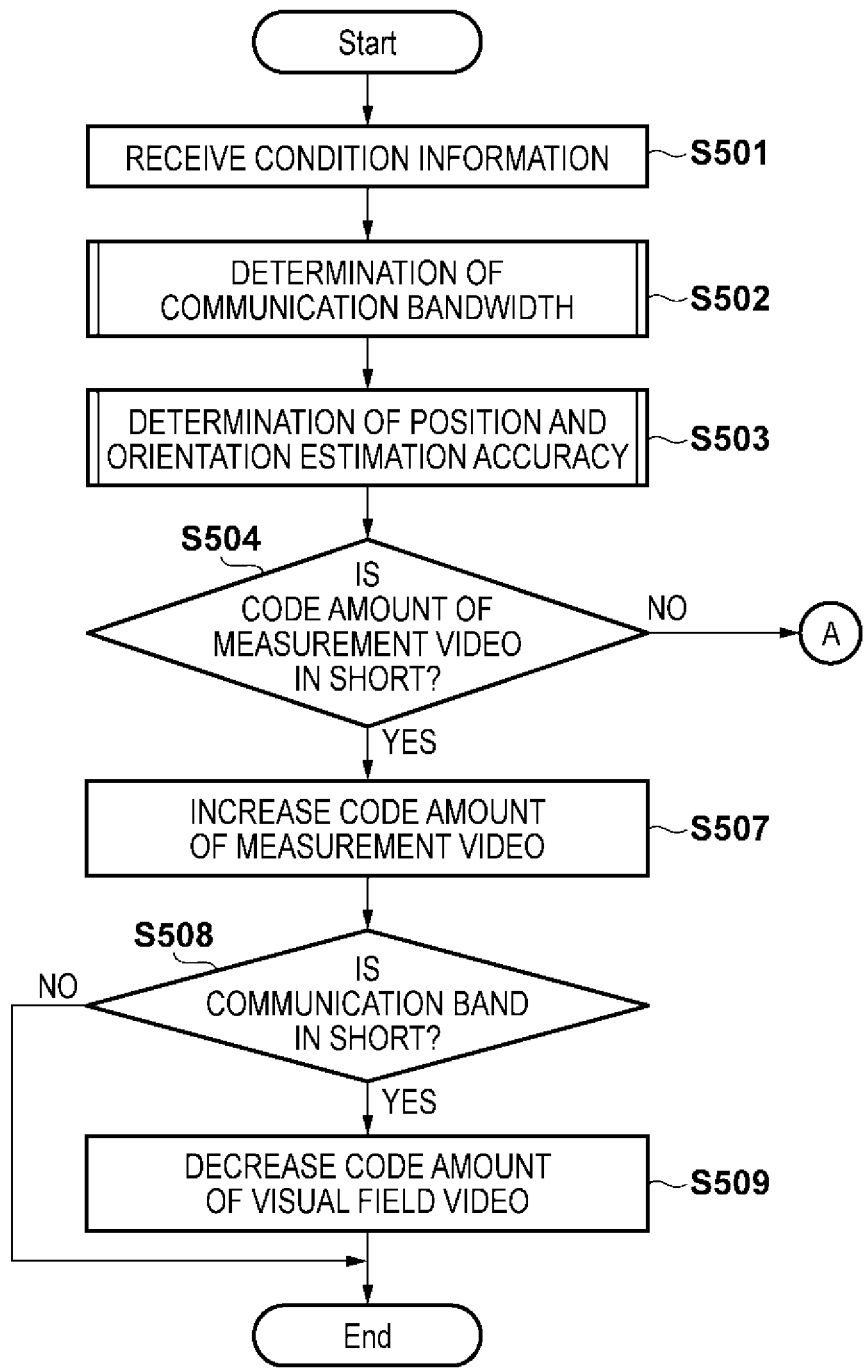

[Fig. 8B]
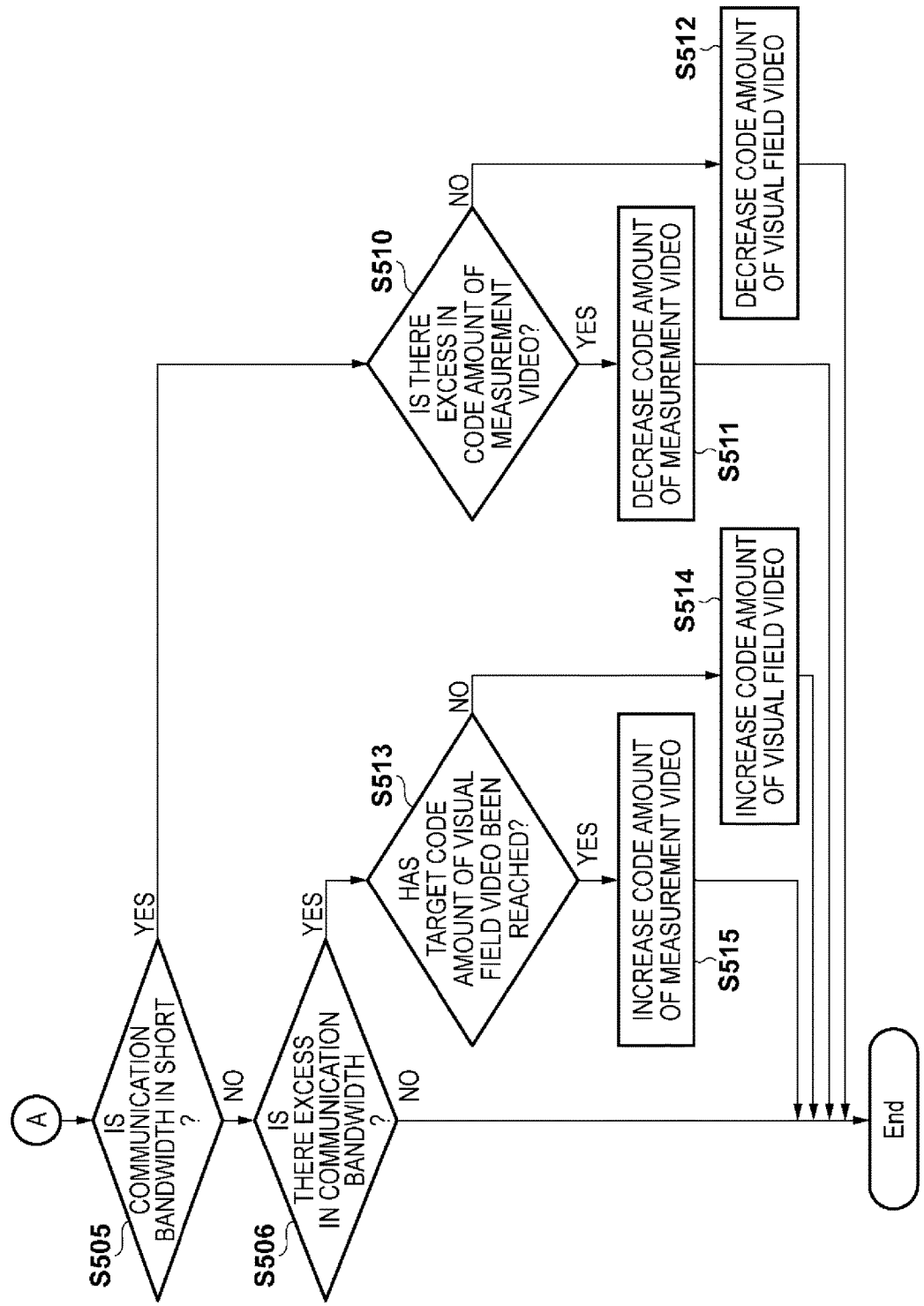

[Fig. 9]
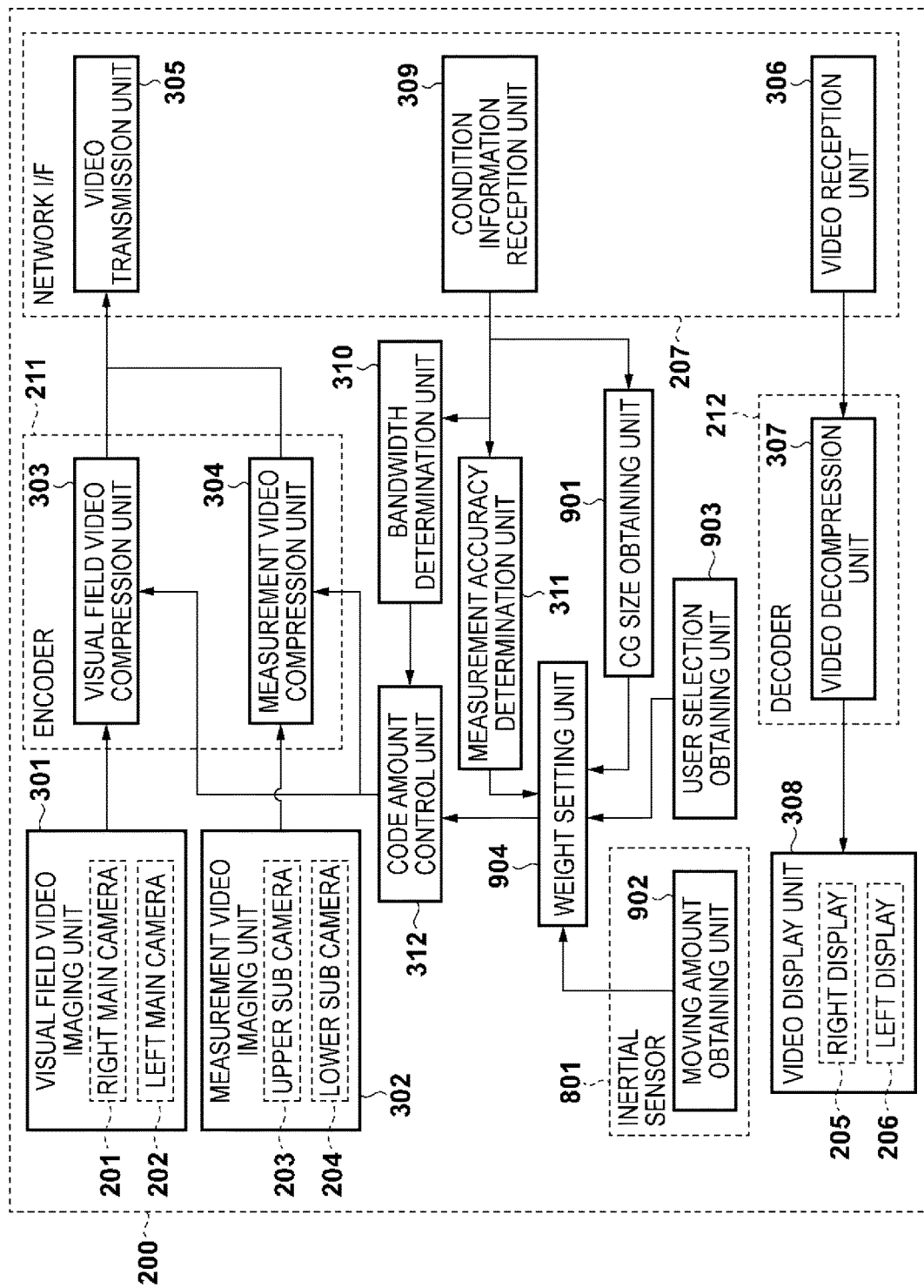

[Fig. 10]
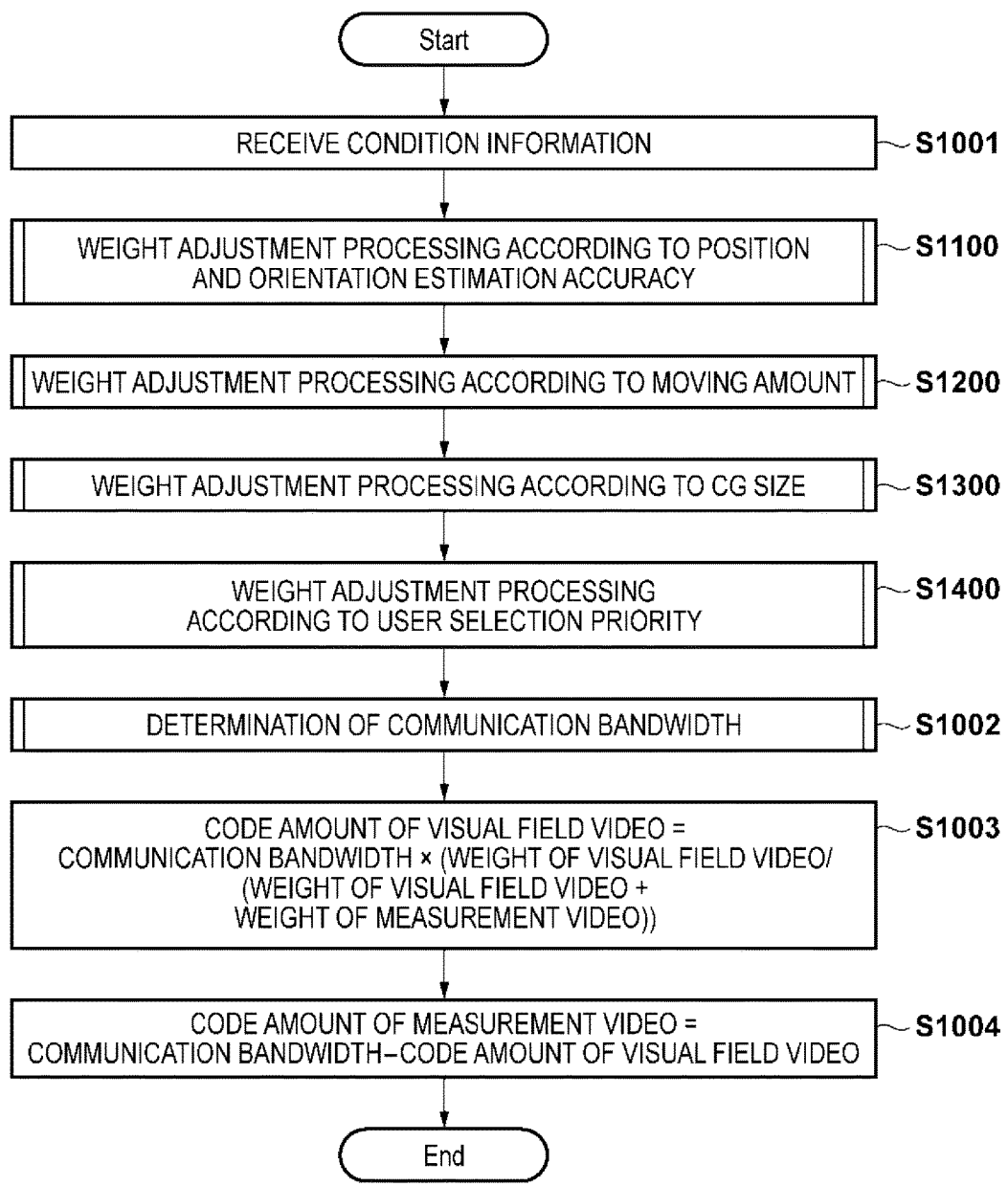

[Fig. 11]
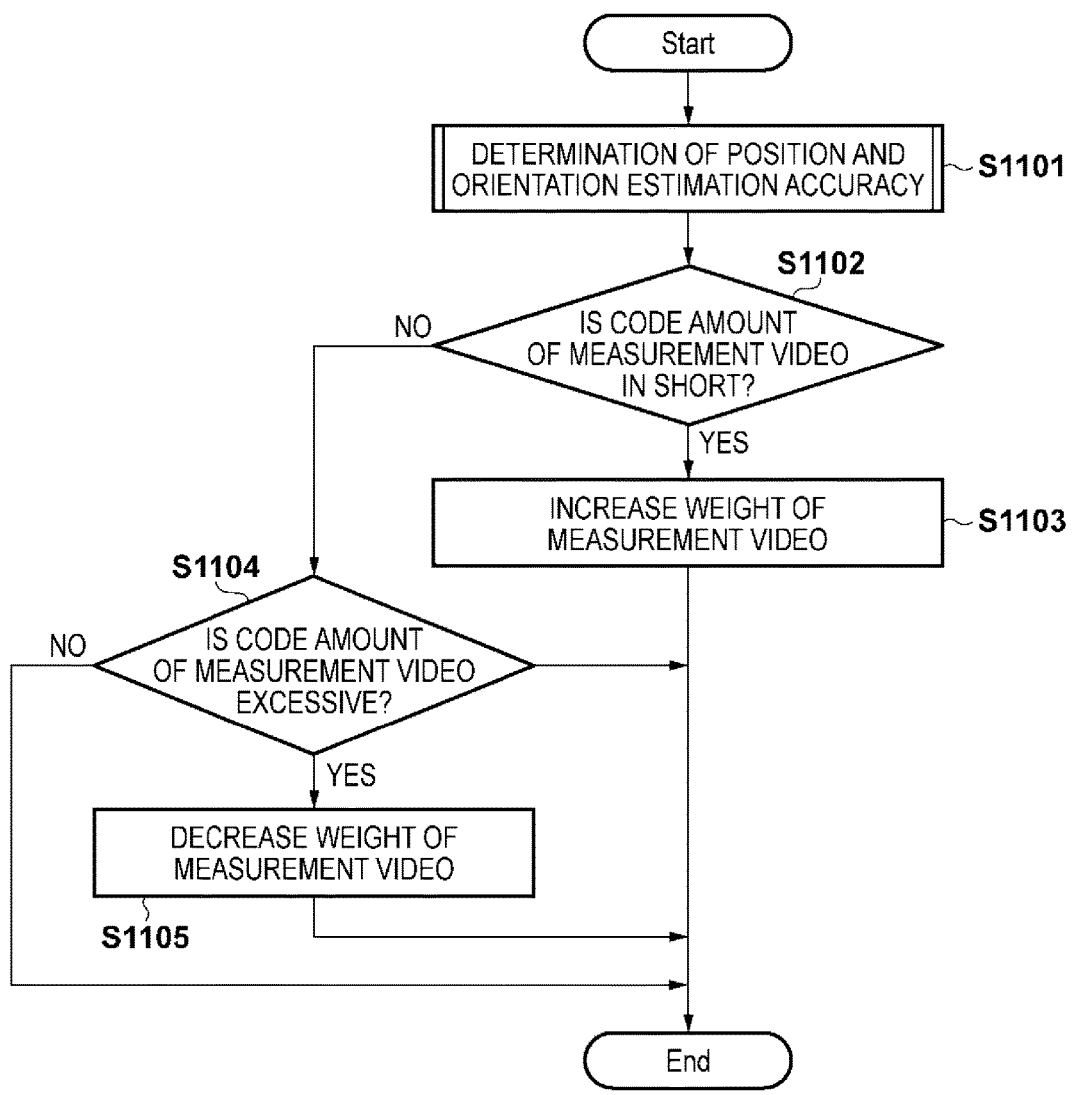

[Fig. 12]
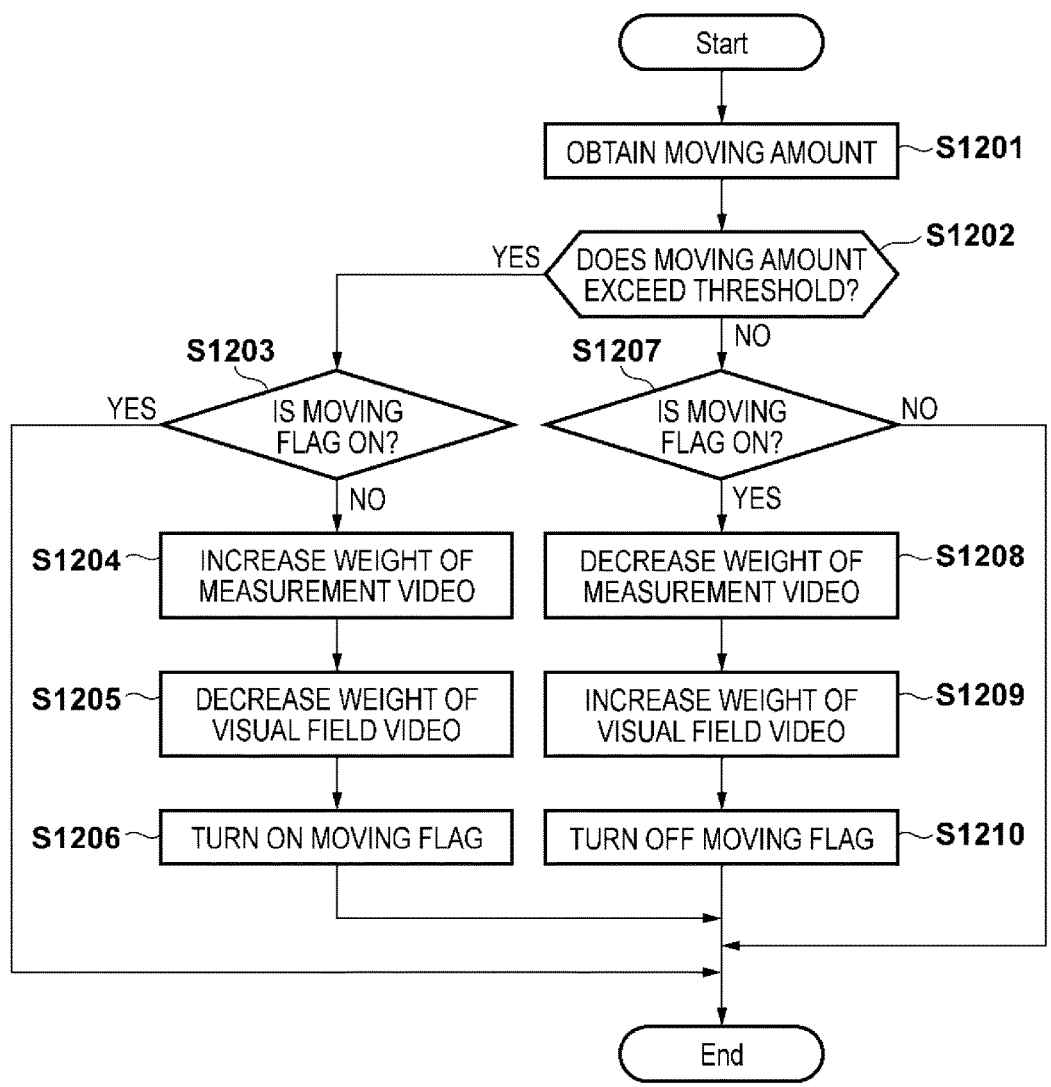

[Fig. 13]
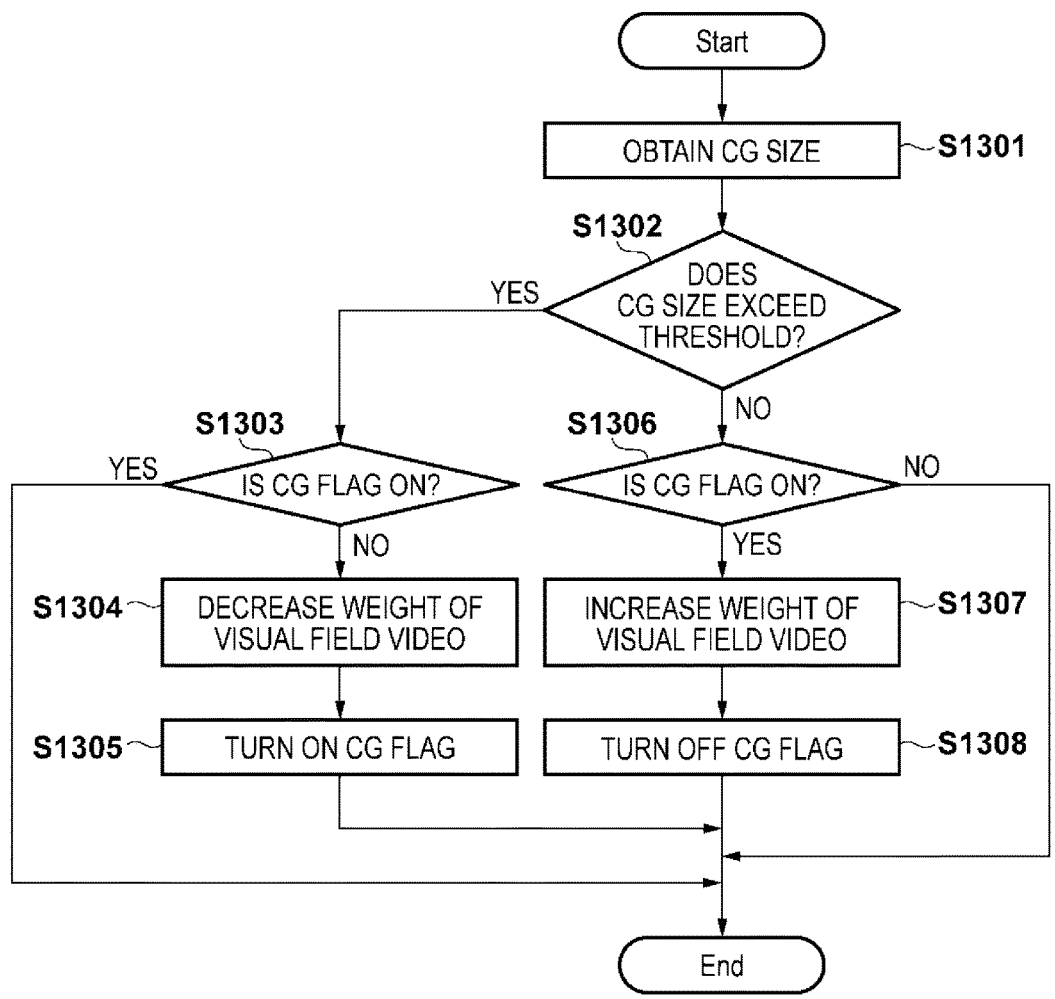

[Fig. 14]
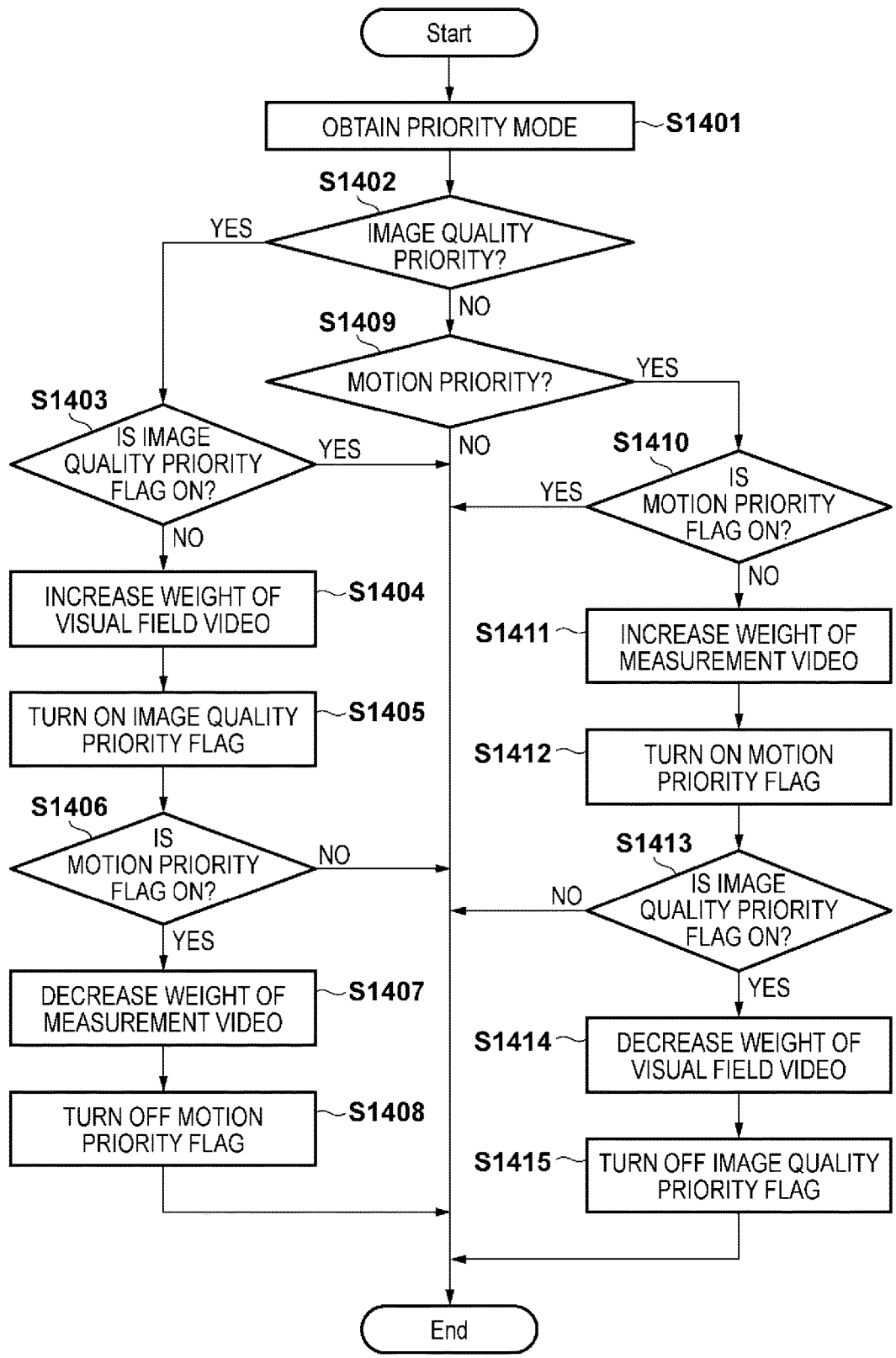

[Fig. 15]

| | WEIGHT OF VISUAL FIELD VIDEO | WEIGHT OF MEASUREMENT VIDEO |
|---|---|---|
| INITIAL VALUE | 100 | 50 |
| CODE AMOUNT OF MEASUREMENT VIDEO IS IN SHORT (S1103) | ±0 | +20 |
| CODE AMOUNT OF MEASUREMENT VIDEO IS EXCESSIVE (S1105) | ±0 | -10 |
| MOVING AMOUNT EXCEEDS THRESHOLD (S1204, S1205) | -10 | +10 |
| SIZE OF REGION ON WHICH CG IS SUPERIMPOSED EXCEEDS THRESHOLD (S1304) | -20 | ±0 |
| MOTION PRIORITY MODE (S1411) | ±0 | +30 |
| IMAGE QUALITY PRIORITY MODE (S1404) | +30 | ±0 |

[Fig. 16]
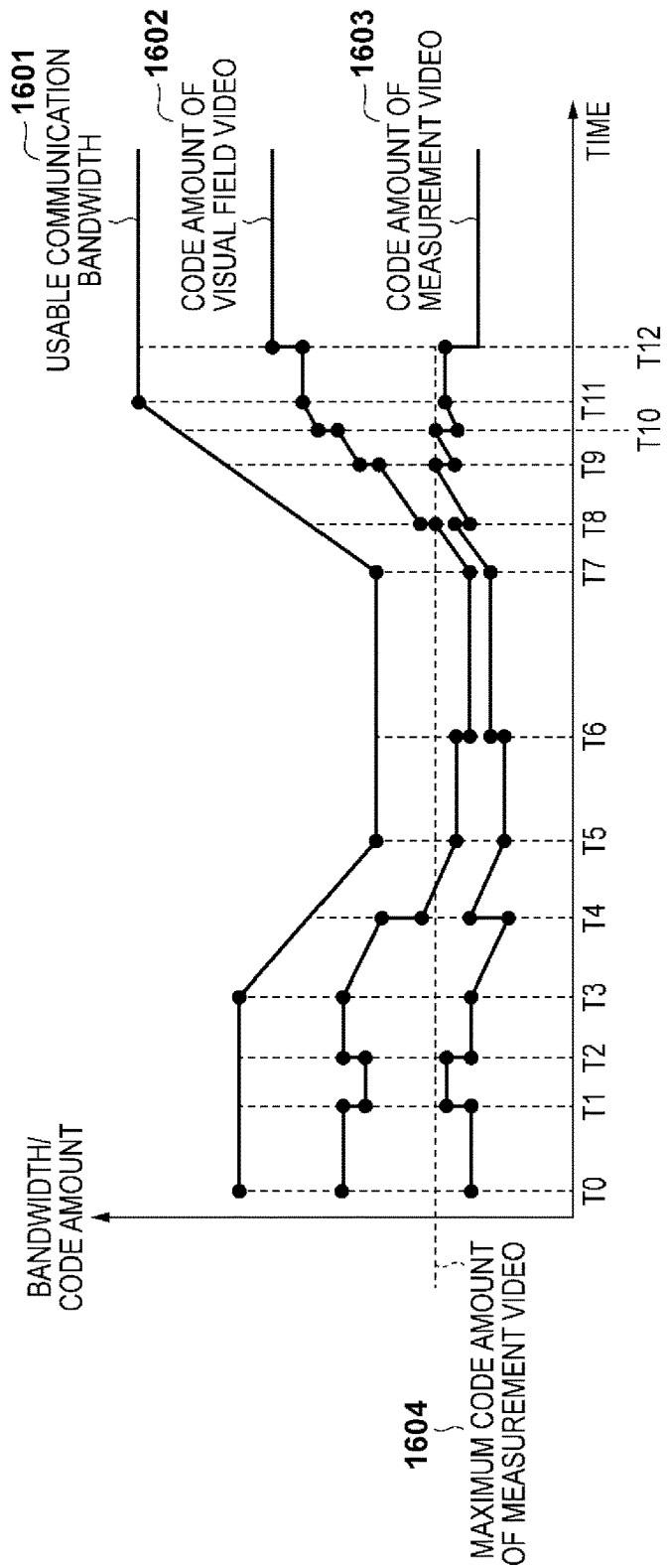

[Fig. 17]
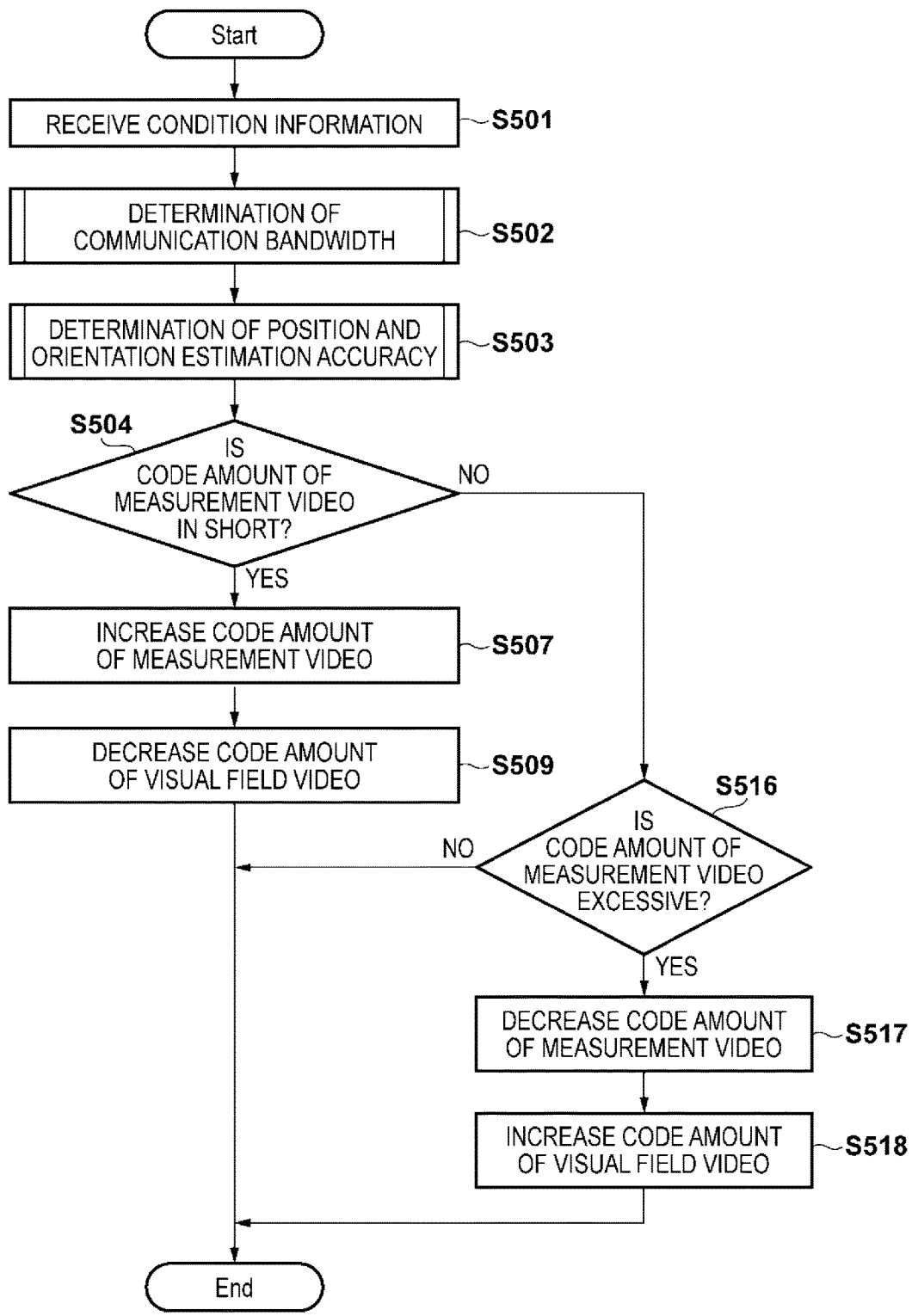

TRANSMISSION APPARATUS, MIXED REALITY SYSTEM, TRANSMISSION METHOD, AND PROGRAM

TECHNICAL FIELD

The present invention relates to a transmission apparatus, a mixed reality system, a transmission control method, and a program.

BACKGROUND ART

An MR (Mixed Reality) system for seamlessly merging the physical world and virtual space in real time has been used. As one of the methods of implementing the MR system, there is provided a video see-through method. In the video see-through method, for example, the visual field region of an HMD user is captured by a video camera attached to an HMD (Head Mounted Display). A CG (Computer Graphics) is superimposed on obtained captured video. At last, the captured video on which the CG is superimposed is presented to the user via a display attached to the HMD.

Japanese Patent laid-Open No. 2004-205711 discloses a technique of using an HMD including the first camera for capturing the visual field region of the HMD user and the second camera for capturing video to detect the position and orientation of the HMD in a video see-through type MR system.

As a technique of reducing a transmission data amount, there is known a method of compressing data by a video coding technique, for example, JPEG (Joint Photographic Expert Group) or H.264/AVC (ISO/IEC 14496-10 MPEG-4 Part10 Advanced Video Coding). In addition, Japanese Patent Laid-Open No. 2006-128997 discloses a technique of calculating an effective communication bandwidth based on a communication error rate and delay information measured by a reception apparatus, and controlling a video coding bit rate based on the effective communication bandwidth.

SUMMARY OF INVENTION

According to an embodiment of the present invention, a transmission apparatus for transmitting, to a reception apparatus, first video captured by an imaging apparatus and second video captured to detect a position and orientation of the imaging apparatus when capturing the first video, comprises: control means for controlling a transmission rate of the first video and a transmission rate of the second video so that a transmission rate ratio between the first video and the second video changes; and transmission means for transmitting the first video and the second video to the reception apparatus in accordance with the controlled transmission rates.

According to another embodiment of the present invention, a transmission apparatus for transmitting, to a reception apparatus, first video captured by an imaging apparatus and second video captured to detect a position and orientation of the imaging apparatus when capturing the first video, comprises: bandwidth determination means for determining a communication bandwidth between the transmission apparatus and the reception apparatus; accuracy determination means for determining, using condition information received from the reception apparatus, estimation accuracy of the position and orientation of the imaging apparatus using the second video; control means for determining transmission rates of the first video and the second video in response to determining that the communication bandwidth has become narrow, and decreasing the transmission rate of the second video in response to determining that the estimation accuracy exceeds a threshold and decreasing the transmission rate of the first video in response to determining that the estimation accuracy is lower than the threshold; first compression means for compressing the first video in accordance with the determined transmission rate; second compression means for compressing the second video in accordance with the determined transmission rate; and transmission means for transmitting the compressed first video and the compressed second video to the reception apparatus.

According to still another embodiment of the present invention, a transmission apparatus for transmitting, to a reception apparatus, first video captured by an imaging apparatus and second video captured to detect a position and orientation of the imaging apparatus when capturing the first video, comprises: bandwidth determination means for determining a communication bandwidth between the transmission apparatus and the reception apparatus; control means for determining, in response to determining that the communication bandwidth has become narrow, transmission rates of the first video and the second video, and decreasing the transmission rate of the second video in response to determining that the current transmission rate of the second video exceeds a threshold and decreasing the transmission rate of the first video in response to determining that the current transmission rate of the second video is not higher than the threshold; first compression means for compressing the first video in accordance with the determined transmission rate; second compression means for compressing the second video in accordance with the determined transmission rate; and transmission means for transmitting the compressed first video and the compressed second video to the reception apparatus.

According to yet another embodiment of the present invention, a transmission apparatus for transmitting, to a reception apparatus, first video captured by an imaging apparatus and second video captured to detect a position and orientation of the imaging apparatus when capturing the first video, comprises: bandwidth determination means for determining a communication bandwidth between the transmission apparatus and the reception apparatus; setting means for setting a weight for at least one of the first video or the second video; control means for determining transmission rates of the first video and the second video in accordance with the communication bandwidth and the set weight; first compression means for compressing the first video in accordance with the determined transmission rate; second compression means for compressing the second video in accordance with the determined transmission rate; and transmission means for transmitting the compressed first video and the compressed second video to the reception apparatus.

According to still yet another embodiment of the present invention, a transmission method comprises: controlling a transmission rate of first video and a transmission rate of second video so that a transmission rate ratio between the first video and the second video changes, wherein the first video is captured by an imaging apparatus and the second video is captured to detect a position and orientation of the imaging apparatus when capturing the first video; and transmitting the first video and the second video to the reception apparatus in accordance with the controlled transmission rates.

According to yet still another embodiment of the present invention, a program comprises instructions for causing a computer to perform a method comprising: controlling a transmission rate of first video and a transmission rate of second video so that a transmission rate ratio between the first video and the second video changes, wherein the first video is captured by an imaging apparatus and the second video is captured to detect a position and orientation of the imaging apparatus when capturing the first video; and transmitting the first video and the second video to the reception apparatus in accordance with the controlled transmission rates.

Further features of the present invention will become apparent from the following description of exemplary embodiments (with reference to the attached drawings).

BRIEF DESCRIPTION OF DRAWINGS

FIG. 1 is a view showing the configuration of an MR system according to the first to fourth embodiments;

FIG. 2 is a block diagram showing the hardware arrangement of an HMD according to the first to third embodiments;

FIG. 3 is a block diagram showing the module arrangement of the HMD according to the first to third embodiments;

FIG. 4 is a block diagram showing the module arrangement of an external PC according to the first to third embodiments;

FIG. 5 is a flowchart illustrating the procedure of code amount control processing according to the first embodiment;

FIG. 6 is a timing chart showing an example of code amount control according to the third embodiment;

FIG. 7 is a timing chart showing an example of code amount control according to the first embodiment;

FIG. 8A is a flowchart illustrating the procedure of code amount control processing according to the third embodiment;

FIG. 8B is a flowchart illustrating the procedure of code amount control processing according to the third embodiment;

FIG. 9 is a block diagram showing the module arrangement of an HMD according to the fourth embodiment;

FIG. 10 is a flowchart illustrating the procedure of code amount control processing according to the fourth embodiment;

FIG. 11 is a flowchart illustrating weight adjustment processing according to the fourth embodiment;

FIG. 12 is a flowchart illustrating the weight adjustment processing according to the fourth embodiment;

FIG. 13 is a flowchart illustrating the weight adjustment processing according to the fourth embodiment;

FIG. 14 is a flowchart illustrating the weight adjustment processing according to the fourth embodiment;

FIG. 15 is a table showing the initial values and increase/decrease amounts of weights according to the fourth embodiment;

FIG. 16 is a timing chart showing an example of code amount control according to the fourth embodiment; and FIG. 17 is a flowchart illustrating the procedure of code amount control processing according to the second embodiment.

DESCRIPTION OF EMBODIMENTS

Processing of detecting the position and orientation of an HMD from captured video and processing of superimposing a CG on the captured video require a large calculation amount. It is, therefore, considered to transmit the captured video to an external apparatus such as a PC, superimpose a CG on the captured video in the external apparatus, and return the thus obtained image to the HMD. In this case, the HMD and the external apparatus can wirelessly communicate with each other to allow the HMD user to experience an MR space while freely moving. Due to communication bandwidth limitations, however, it is necessary to reduce the communication data amount as much as possible.

However, a high-resolution captured video is required to detect the position and orientation of the HMD from the captured video using, for example, a method of extracting an index from the captured video. Therefore, largely compressing video from the second camera by the method described in Japanese Patent Laid-Open No. 2004-205711 imposes a problem that the position and orientation detection accuracy of the HMD degrades. Furthermore, strongly compressing video from the first camera by the method described in Japanese Patent Laid-Open No. 2004-205711 imposes a problem that the quality of video obtained by superimposing a CG on the video from the first camera deteriorates and reality presented to the user degrades.

An embodiment of the present invention enables suppressing deterioration of reality presented to the user by the MR system.

The present invention will be described in detail below based on embodiments with reference to the accompanying drawings. Note that arrangements to be described in the following embodiments are merely examples, and the present invention is not limited to the illustrated arrangements.

First Embodiment

A transmission apparatus according to the first embodiment transmits, to a reception apparatus, visual field video (first video) captured by an imaging apparatus and measurement video (second video) captured to detect the position and orientation of the imaging apparatus when capturing the first video. A head mounted display (HMD) as an embodiment of the transmission apparatus according to the first embodiment and a mixed reality system (MR system) in which the HMD is used will be described below.

In the MR system according to this embodiment, the HMD transmits, to an external PC, data of video captured by a mounted imaging apparatus. This video is video of the visual field region of the user wearing the HMD, and will be referred to as visual field video hereinafter. The external PC generates synthesized video by synthesizing the transmitted visual field video and a superimposing image (for example, a CG). The external PC returns the generated synthesized video to the HMD. The HMD displays the transmitted synthesized video on a mounted display.

The MR system according to this embodiment generates synthesized video based on the position and orientation of the imaging apparatus mounted in the HMD, that is, the position and orientation of the HMD. For example, it is possible to merge the physical world and virtual space by synthesizing visual field video seen from the HMD in a given position and orientation and virtual video seen from a position corresponding to the position and orientation in the virtual space. To do this, the HMD transmits, to the external PC, data of video captured by the mounted imaging apparatus. This video is different from the visual field video, and will be referred to as measurement video hereinafter. The external PC detects the position and orientation of the HMD using the measurement video, and generates synthesized video by synthesizing the visual field video and a superimposing image (for example, a CG) generated in accordance with the detected position and orientation of the HMD. The external PC may detect the position and orientation of the HMD using both the visual field video and the measurement video, as a matter of course. A method of detecting the position and orientation of the HMD will be described later.

The imaging range of the measurement video is different from that of the visual field video. In an embodiment, the HMD includes two or more cameras as an imaging apparatus, and at least one camera captures visual field video and at least one camera captures measurement video. In addition, imaging conditions may be different between the visual field video and the measurement video so as to readily detect an index from the measurement video. For example, a focal distance or a depth of field may be different between the visual field video and the measurement video.

In another embodiment, the HMD may include one camera as an imaging apparatus, and a partial region of video captured by the camera may be used as visual field video and another region or the entire region of the video captured by the camera may be used as measurement video. In general, as the quality of visual field video transmitted to the external PC is higher, the quality of obtained synthesized video improves. On the other hand, measurement video transmitted to the external PC need only have quality so as to be able to measure the position and orientation of the HMD. If the quality of measurement video is sufficiently high, even if it is further improved, the quality of obtained synthesized video does not improve so much. However, if the quality of measurement video transmitted to the external PC degrades, and it becomes impossible to measure the position and orientation of the HMD, it becomes impossible to generate synthesized video and merge the physical space and virtual space.

An example of the MR system according to this embodiment will be described below with reference to FIG. 1. FIG. 1 is a view showing the configuration of the MR system according to this embodiment. A user 101 of the MR system wears an HMD 200. The detailed hardware arrangement of the HMD 200 will be described later with reference to FIG. 2.

An access point 102 is connected to the HMD 200 by wireless communication. Examples of a wireless communication method are an IEEE802.11n method and IEEE802.11ac method but the present invention is not limited to them. The access point 102 may be connected to the HMD 200 by wired communication. In this case, a wired communication method such as Gigabit Ethernet® or IEEE1394 can be used.

A visual field video data group 103 is a packet group of visual field video data captured by a right main camera 201 and left main camera 202 of the HMD 200. A measurement video data group 104 is a packet group of measurement video data captured by an upper sub camera 203 and lower sub camera 204 of the HMD 200. In this embodiment, to increase the imaging probability of a marker by widening the imaging range, the two upper and lower sub cameras are used in addition to the two right and left main cameras. The HMD 200 includes, as an imaging apparatus, the right main camera 201, left main camera 202, upper sub camera 203, and lower sub camera 204. Each of the number of main cameras and the number of sub cameras may be one, or three or more.

In this embodiment, the right main camera 201, left main camera 202, upper sub camera 203, and lower sub camera 204 perform imaging at the same time. However, as long as it is possible to estimate the position of the imaging apparatus, these cameras need not perform imaging at the same time. It is not essential that the upper sub camera 203 and lower sub camera 204 are provided in the HMD 200. If the positions of the right main camera 201 and left main camera 202 can be estimated, these cameras may be separated from the HMD 200.

An external PC 400 performs image analysis for each measurement video using the measurement video data group 104 received from the HMD 200, thereby detecting a marker to be used as a position index in the physical space. The external PC 400 estimates the position and orientation of the imaging apparatus, that is, the HMD 200 using the detected marker. More specifically, the external PC 400 detects a marker from each measurement video, and obtains information such as the size, shape, or filling pattern of the marker. Using the information, the external PC 400 can calculate the three-dimensional position and orientation information of the HMD 200 including the relative positional relationship between the marker and the HMD 200 and a direction in which the user 101 (or HMD 200) observes the marker.

If, for example, a plurality of markers are used, index arrangement information indicating the positional relationship between the respective markers is defined in advance, and is collated with the positional relationship between markers in each video captured by the HMD 200, thereby making it possible to estimate the position and orientation of the HMD 200. The position and orientation of the HMD 200 can be estimated based on directions in which the HMD observes the markers and the distances to the markers. The markers can be produced in advance, and arranged at predetermined positions in the physical space. If such method is used, it is not necessary to use markers having filling patterns so as to be able to identify the observation directions of the markers. For example, it is possible to use markers each having one-dimensional information without information indicating a direction, like color markers or light-emitting elements such as LEDs.

Furthermore, it is possible to use, as an index, a natural feature point in each video such as the contour of a door, table, or window, or a feature such as a specific color in each video. In addition, by using a plurality of markers of the same type, using a plurality of types of markers at the same time, or using a combination of a marker produced in advance and a natural feature point in each video, it is possible to estimate the position and orientation of the HMD 200 with higher accuracy. By defining the positional relationship between a plurality of indices in advance, it is possible to estimate the position and orientation of the HMD 200 based on each index even if not all the indices are included in an image.

Upon detecting the position and orientation of the HMD 200, the external PC 400 generates synthesized video by superimposing a CG generated based on the detected position and orientation on visual field video. In this embodiment, the external PC 400 generates right-eye synthesized video and left-eye synthesized video. The right-eye synthesized video and the left-eye synthesized video will be correctively referred to as synthesized videos hereinafter. The external PC 400 transmits a generated synthesized video data group 105 to the HMD 200, and the HMD 200 outputs the received synthesized videos to a right display 205 and a left display 206 to display them.

FIG. 2 is a block diagram showing the hardware arrangement of the HMD 200. The right main camera 201 is a camera for capturing visual field video seen by the right eye of the user 101. The left main camera 202 is a camera for capturing visual field video seen by the left eye of the user 101.

The upper sub camera 203 is a camera for capturing measurement video, and has an imaging range in the upper direction, compared to the line-of-sight direction of the user 101. The lower sub camera 204 is a camera for capturing measurement video, and has an imaging range in the lower direction, compared to the line-of-sight direction of the user 101.

The right display 205 is a display for outputting the right-eye synthesized video, and is arranged to present the synthesized video to the right eye of the user 101. The left display 206 is a display for outputting the left-eye synthesized video, and is arranged to present the synthesized video to the left eye of the user 101.

A network interface 207 is an interface with a network. The HMD 200 can be connected to the network such as the Internet or a LAN via the network interface 207, and can communicate with the external PC 400 via the network. The HMD 200 may be able to directly communicate with the external PC 400 via the network interface 207.

A CPU (Central Processing Unit) 208 operates according to programs to totally control respective hardware components. A ROM (Read Only Memory) 209 stores control programs to be executed by the CPU 208, and the like. A RAM (Random Access Memory) 210 functions as the main memory, the work area, or the like of the CPU 208.

An encoder 211 compresses video captured by the right main camera 201, left main camera 202, upper sub camera 203, and lower sub camera 204. Examples of encoding methods used for compression are JPEG, H.264/AVC, and H.264/MVC but the present invention is not limited to them. The network interface 207 transmits, to the external PC 400, as the visual field video data group 103, data obtained by compressing, by the encoder 211, the visual field video from the right main camera 201 and left main camera 202. Furthermore, the network interface 207 transmits, to the external PC 400, as the measurement video data group 104, data obtained by compressing, by the encoder 211, the measurement video from the upper sub camera 203 and lower sub camera 204. The visual field video data group 103 and the measurement video data group 104 need not be transmitted at the same time, and may be time-divisionally transmitted.

A decoder 212 decompresses the synthesized video data group 105 received from the external PC 400. A decoding method used for decompression depends on the encoding method used by the external PC 400 for compression but is not specifically limited. The synthesized video data group 105 may be uncompressed RAW data. In this case, the HMD 200 need not include the decoder 212. The synthesized videos decompressed by the decoder 212 are displayed on the right display 205 and left display 206. The encoder 211 and the decoder 212 may be implemented by hardware or software. In the latter case, the functions of the encoder 211 and decoder 212 are implemented when the CPU 208 operates according to programs. A bus 213 connects the respective components of the HMD 200, and is used as a transfer path for various kinds of data.

FIG. 3 is a block diagram showing the functional arrangement of the HMD 200. In this embodiment, a measurement accuracy determination unit 311 is not used, and this function can be omitted.

A visual field video imaging unit 301 captures visual field video by controlling the right main camera 201 and the left main camera 202. A measurement video imaging unit 302 captures measurement video by controlling the upper sub camera 203 and the lower sub camera 204. In this embodiment, the visual field video include the video captured by the right main camera 201 and the video captured by the left main camera 202. The measurement video include the video captured by the upper sub camera 203 and the video captured by the lower sub camera 204. A visual field video compression unit 303 (first compression unit) controls the encoder 211 to compress the visual field video obtained from the visual field video imaging unit 301. A measurement video compression unit 304 (second compression unit) controls the encoder 211 to compress the measurement video obtained from the measurement video imaging unit 302. In accordance with code amounts controlled by a code amount control unit 312, the visual field video compression unit 303 and the measurement video compression unit 304 compress the visual field video and measurement video so that the compressed visual field video and measurement video respectively have the code amounts controlled by the code amount control unit 312.

An video transmission unit 305 packetizes the compressed video data obtained from the visual field video compression unit 303 and the measurement video compression unit 304 in accordance with a communication protocol, and transmits them to the external PC 400 via the network interface 207. Since the MR system requires a high real-time characteristic, a communication protocol such as RTP (A Transport Protocol for Real-Time Applications, RFC 3550, IETF)/UDP (User Datagram Protocol) can be used. Other communication protocols and a proprietary protocol can be used, as a matter of course. The video transmission unit 305 need not directly transmit the compressed video data to the external PC 400, and may transmit the compressed video data to the external PC 400 via another apparatus.

A video reception unit 306 depacketizes a synthesized video data group received from the external PC 400 via the network interface 207, in accordance with the communication protocol. A video decompression unit 307 controls the decoder 212 to decompress the data obtained from the video reception unit 306, thereby obtaining synthesized videos. A video display unit 308 outputs the synthesized videos obtained by the video decompression unit 307 to the right display 205 and left display 206.

A condition information reception unit 309 receives condition information indicating the condition of the HMD 200. In this embodiment, the condition information indicates a communication condition in data transmission from the HMD 200 to the external PC 400. For example, the condition information can include a communication status report between the HMD 200 and the external PC 400. The communication status report can be, for example, information capable of grasping a communication error rate (for example, a packet loss rate) or delay information (for example, a communication delay time), such as Receiver Report or Sender Report of RTCP (Real-time Transport Control Protocol). In addition, the communication status report may have a proprietary format. Using this communication status report, it is possible to determine a communication bandwidth usable for data transmission from the HMD 200 to the external PC 400. The external PC 400 may calculate a communication bandwidth usable for data transmission from the HMD 200 to the external PC 400, as a matter of course. In this case, the communication status report may include bandwidth information indicating the communication bandwidth calculated by the external PC 400.

In an embodiment, the external PC 400 packetizes the condition information and transmits it to the HMD 200. The condition information reception unit 309 can obtain the condition information by depacketizing, in accordance with the communication protocol, the data received from the external PC 400 via the network interface 207. The video reception unit 306 and the condition information reception unit 309 need not directly receive the synthesized video data and the condition information from the external PC 400, and may receive the pieces of information from the external PC 400 via another apparatus.

Based on the communication status report obtained from the condition information reception unit 309, a bandwidth determination unit 310 determines a communication bandwidth between the HMD 200 and the external PC 400, more specifically, a communication bandwidth usable for data transmission from the HMD 200 to the external PC 400. For example, TFRC (TCP Friendly Rate Control, RFC 5348, IETF) is used as a method of determining a communication bandwidth. By using TFRC, it is possible to calculate a usable communication bandwidth based on the communication error rate and the delay information. However, the method of determining a communication bandwidth is not limited to TFRC, and any other arbitrary method can be used.

Based on the communication bandwidth usable for data transmission from the HMD 200 to the external PC 400, which has been determined by the bandwidth determination unit 310, the code amount control unit 312 controls the code amounts of the visual field video and measurement video compressed by the visual field video compression unit 303 and measurement video compression unit 304. Since the video transmission unit 305 transmits the compressed visual field video and measurement video to the external PC 400, this processing corresponds to processing of controlling the transmission rates of the visual field video and measurement video transmitted to the external PC 400. The code amount control unit 312 controls the transmission rate (code amount) of the visual field video and that of the measurement video so that the transmission rate ratio between the visual field video and the measurement video changes. A practical control method will be described later with reference to FIGS. 5 and 6. The video transmission unit 305 transmits, to the external PC 400, the visual field video and the measurement video compressed according to the code amounts controlled by the code amount control unit 312 at the transmission rates controlled by the code amount control unit 312.

FIG. 4 is a block diagram showing the module arrangement of the external PC 400. The external PC 400 is a general computer, and includes a CPU and a memory. The functions of respective units shown in FIG. 4 are implemented when the CPU operates according to programs in the memory.

A video reception unit 401 receives the visual field video data and measurement video data from the HMD 200. A measurement video decompression unit 402 obtains measurement video by decompressing the data received by the video reception unit 401. An index detection unit 403 detects an index such as a marker by performing image analysis processing for each measurement video obtained by the measurement video decompression unit 402. For example, the index detection unit 403 can determine, as information about the index, the position of the index on each measurement video, identification information of the index, and the like. A position and orientation estimation unit 404 estimates the three-dimensional position and orientation of the HMD 200 using the information about the index detected by the index detection unit 403 and index arrangement information 405 in which the position of index and the like are defined in advance.

A CG generation unit 406 generates a CG based on the position and orientation of the HMD 200 estimated by the position and orientation estimation unit 404. This CG can be, for example, virtual video, in the virtual space, seen from a position and orientation in the virtual space corresponding to the position and orientation of the HMD 200. A visual field video decompression unit 407 obtains visual field video by decompressing the data received by the video reception unit 401. A CG superimposition unit 408 generates synthesized videos by superimposing the CG generated by the CG generation unit 406 on each visual field video obtained from the visual field video decompression unit 407.

A synthesized video compression unit 409 compression-encodes the synthesized videos obtained from the CG superimposition unit 408. However, compression of the synthesized videos is not essential. If the synthesized videos are not compressed, the synthesized video compression unit 409 is not included in the external PC 400, or is not used. The synthesized video compression unit 409 may dynamically control the code amount of the compressed synthesized videos based on a communication bandwidth usable for data transmission from the external PC 400 to the HMD 200. On the other hand, the code amount of the compressed synthesized videos may be constant. A synthesized video transmission unit 410 packetizes the synthesized videos compressed by the synthesized video compression unit 409 in accordance with the communication protocol, and transmits the packetized data to the HMD 200 as a synthesized video data group.

A condition information generation unit 411 obtains, from the video reception unit 401, information indicating the reception status of the video data from the HMD 200, and generates condition information. As described above, the condition information can be a communication status report including a communication error rate or delay information. A condition information transmission unit 412 obtains the communication status report from the condition information generation unit 411, packetizes it in accordance with the communication protocol, and transmits the obtained data to the HMD 200.

FIG. 5 is a flowchart illustrating a method of controlling the code amounts of the compressed visual field video and measurement video by the code amount control unit 312. Processing shown in FIG. 5 is repeatedly performed at predetermined time intervals. Data transmission control from the HMD 200 to the external PC 400 is performed using the code amounts controlled by the processing shown in FIG. 5.

In this embodiment, the code amount control unit 312 controls the code amounts (transmission rates) of the visual field video and measurement video based on the communication bandwidth between the HMD 200 and the external PC 400. More specifically, based on a change in communication bandwidth usable for data transmission from the HMD 200 to the external PC 400, the code amount control unit 312 controls the code amounts (transmission rates) of the visual field video and measurement video so that the code amount (transmission rate) ratio between the visual field video and the measurement video changes. In this embodiment, in order for the external PC 400 to perform measurement processing of the position and orientation of the HMD 200 with sufficient accuracy, the code amounts of the visual field video and measurement video are controlled so that the code amount of the measurement video becomes equal to or larger than a preset minimum code amount.

In step S501, the condition information reception unit 309 receives the condition information from the external PC 400.

In step S502, the bandwidth determination unit 310 determines a communication bandwidth with reference to the condition information received in step S501, as described above.

In step S505, the code amount control unit 312 determines whether the communication bandwidth calculated in step S502 is in short. More specifically, if the sum of the code amounts of the current visual field video and the current measurement video exceeds the communication bandwidth calculated in step S502, it can be determined that the communication bandwidth is in short. If the communication bandwidth is in short, the process advances to step S510; otherwise, the process advances to step S506.

In step S506, the code amount control unit 312 determines whether there is an excess in the communication bandwidth calculated in step S502. More specifically, if the sum of the code amount of the current visual field video and that of the current measurement video is smaller than the communication bandwidth calculated in step S502, it can be determined that there is an excess in the communication bandwidth. If there is an excess in the communication bandwidth, the process advances to step S513; otherwise, the process ends.

In step S510, the code amount control unit 312 determines whether there is an excess in the code amount of the current measurement video. More specifically, if the code amount of the current measurement video is larger than the preset minimum code amount value, it can be determined that there is an excess in the code amount of the measurement video. If there is an excess of the code amount of the current measurement video, the process advances to step S511; otherwise, the process advances to step S512.

In step S511, the code amount control unit 312 decreases the code amount of the current measurement video. For example, the code amount control unit 312 can decrease the code amount of the measurement video by the difference between the total code amount of the current visual field video and measurement video and the communication bandwidth calculated in step S502. On the other hand, if the difference between the communication bandwidth calculated in step S502 and the code amount of the current visual video is smaller than the preset minimum code amount, it is possible to set the preset minimum code amount as the code amount of the measurement video. In this case, it is possible to set, as the code amount of the visual field video, the difference between the communication bandwidth calculated in step S502 and the preset minimum code amount.

In step S512, the code amount control unit 312 decreases the code amount of the current visual field video. For example, the code amount control unit 312 can decrease the code amount of the visual field video by the difference between the total code amount of the current visual field video and measurement video and the communication bandwidth calculated in step S502.

In step S513, the code amount control unit 312 determines whether the code amount of the current visual field video has reached a preset target code amount. If the code amount of the current visual field video has reached the target code amount, the process advances to step S515; otherwise, the process advances to step S514.

In step S514, the code amount control unit 312 increases the code amount of the visual field video. For example, the code amount control unit 312 can increase the code amount of the visual field video by a fixed value. As another method, the code amount control unit 312 can increase the code amount of the visual field video by the difference between the communication bandwidth calculated in step S502 and the total code amount of the current visual field video and measurement video.

In step S515, the code amount control unit 312 increases the code amount of the measurement video. For example, the code amount control unit 312 can increase the code amount of the measurement video by a fixed value. As another method, the code amount control unit 312 can increase the code amount of the measurement video by the difference between the communication bandwidth calculated in step S502 and the total code amount of the current visual field video and measurement video.

As described above, if it is determined in step S505 that the communication bandwidth has become narrow, and it is determined in step S510 that the code amount of the measurement video exceeds the threshold, the code amount control unit 312 decreases the code amount of the measurement video in step S511. If it is determined in step S505 that the communication bandwidth has become narrow, and it is determined in step S510 that the code amount of the measurement video is equal to or smaller than the threshold, the code amount control unit 312 decreases the code amount of the visual field video in step S512.

FIG. 7 is a timing chart showing an example of code amount control according to this embodiment. In FIG. 7, the abscissa represents the time and the ordinate represents the communication bandwidth/code amount. A usable communication bandwidth 601 indicates a variation of the communication bandwidth usable for data transmission from the HMD 200 to the external PC 400, which has been determined by the bandwidth determination unit 310. A code amount 602 of the visual field video shows a variation of the value determined as the code amount of the compressed visual field video. A code amount 603 of the measurement video shows a variation of the value determined as the code amount of the compressed measurement video. A target code amount 604 indicates the preset target code amount of the measurement video.

At time T0, the HMD 200 receives the condition information from the external PC 400 for the first time after the start of an operation, and grasps the usable communication bandwidth. At time T0, preset initial values are used as the code amounts of the visual field video and measurement video, and there is an excess of the current communication bandwidth. Furthermore, the code amount 602 of the visual field video has not reached the target code amount 604. Therefore, in step S515, the code amount control unit 312 increases the code amount 602 of the visual field video by the fixed value. This processing is repeated until time T1.

At time T1, since the total code amount of the visual field video and measurement video reaches the usable bandwidth, it is determined in step S506 that there is no excess of the communication bandwidth, and the code amounts of the visual field video and measurement video are maintained. This processing is repeated until time T2.

During a period from time T2 to time T4, the usable communication bandwidth decreases. In a section from time T2 to time T3, the code amount control unit 312 decreases, in step S511, the code amount 603 of the measurement video in accordance with the decrease in communication bandwidth. At time T3, the code amount 603 of the measurement video reaches the minimum code amount. Therefore, it is determined in step S510 that there is no excess of the code amount 603 of the measurement video. Thus, in a section from time T3 to time T4, the code amount control unit 312 decreases, in step S512, the code amount 602 of the visual field video in accordance with the decrease in communication bandwidth.

During a period from time T4 to time T5, the usable communication bandwidth does not vary. In a section from time T4 to time T5, it is determined in step S506 that there is no excess of the communication bandwidth, and the code amounts of the visual field video and the measurement video are maintained.

During a period from time T5 to time T7, the usable communication bandwidth increases. In a section from time T5 to time T6, the code amount control unit 312 increases, in step S514, the code amount 602 of the visual field video in accordance with the increase in communication bandwidth. At time T6, it is determined in step S513 that the code amount 602 of the visual field video reaches the target code amount 604. Therefore, in a section from time T6 to time T7, the code amount control unit 312 increases, in step S515, the code amount 603 of the measurement video in accordance with the increase in communication bandwidth.

After time T7, the usable communication bandwidth does not vary. Therefore, it is determined in step S506 that there is no excess of the communication bandwidth, and the code amounts of the visual field video and measurement video are maintained.

As describe above, according to this embodiment, the code amount 602 of the visual field video and the code amount 603 of the measurement video are controlled so that the ratio between the code amount 602 of the visual field video and the code amount 603 of the measurement video changes in accordance with the usable communication bandwidth 601. More specifically, this control is executed so that the code amount 603 of the measurement video becomes equal to or larger than a minimum code amount 701. By controlling the code amounts so that the code amount 603 of the measurement video suffices to estimate the position and orientation of the HMD 200, it is possible to reduce the possibility that the external PC 400 fails to estimate the position and orientation of the HMD 200 and synthesized video fails.

On the other hand, before the usable communication bandwidth 601 exceeds the sum of the minimum code amount 701 (second setting value) of the measurement video and the target code amount 604 (first setting value) of the visual field video, the code amount 603 of the measurement video is controlled to be equal to the minimum code amount 701. The code amount 602 of the visual field video is controlled to be smaller than the target code amount 604. With this arrangement, it is possible to increase the code amount of the visual field video to be used to generate synthesized video as much as possible while suppressing the possibility that estimation of the position and orientation of the HMD 200 fails, thereby improving the quality of the synthesized video. As described above, according to this embodiment, before the usable communication bandwidth 601 exceeds the sum of the minimum code amount 701 of the measurement video and the target code amount 604 of the visual field video, as the usable communication bandwidth 601 becomes narrower, the ratio of the code amount 603 of the measurement video to the code amount 602 becomes higher.

In this embodiment, the target code amount 604 is set as the upper limit of the code amount 602 of the visual field video. As described above, according to this embodiment, if the usable communication bandwidth 601 exceeds the sum of the minimum code amount 701 (second setting value) of the measurement video and the target code amount 604 (first setting value) of the visual field video, the code amount 602 of the visual field video is controlled to be equal to the target code amount 604. On the other hand, the code amount 603 of the measurement video is controlled to exceed the minimum code amount 701. With this arrangement, when there is an excess of the communication bandwidth, it is possible to use the excess of the communication bandwidth to improve the position and orientation estimation accuracy, instead of improving the quality of the measurement video by exceeding the display performance of the HMD 200. As described above, in this embodiment, if the usable communication bandwidth 601 exceeds the sum of the minimum code amount 701 of the measurement video and the target code amount 604 of the visual field video, as the usable communication bandwidth 601 becomes wider, the ratio of the code amount 603 of the measurement video to the code amount 602 becomes higher. It is not essential to set the upper limit of the code amount 602 of the visual field video, as a matter of course.

Furthermore, it is not necessary to set fixed values as the minimum code amount 701 of the measurement video and the target code amount 604 of the visual field video. For example, the code amount control unit 312 may set the ratio between the code amount 602 of the visual field video and the code amount 603 of the measurement video in accordance with the usable communication bandwidth 601. For example, it is possible to increase the ratio of the code amount 603 of the measurement video to the code amount 602 when the usable communication bandwidth 601 is narrower than the threshold, as compared with a case in which the usable communication bandwidth 601 is wider than the threshold.

Second Embodiment

According to the second embodiment, a code amount control unit 312 controls the code amounts (transmission rates) of visual field video and measurement video so that the transmission rate ratio between the visual field video and the measurement video changes in accordance with the position and orientation estimation accuracy of an HMD 200 using the measurement video by an external PC 400. As an example, in order for the external PC 400 to perform measurement processing of the position and orientation of the HMD 200 with sufficient accuracy, the code amounts of the visual field video and measurement video are controlled so as to be able to detect an index from each measurement video. In this embodiment, assume that a usable communication bandwidth is fixed.

The arrangements of the HMD 200 and the external PC 400 are the same as in the first embodiment except that the HMD 200 includes a measurement accuracy determination unit 311 instead of the bandwidth determination unit 310, and a detailed description thereof will be omitted. In this embodiment, condition information includes information indicating the position and orientation estimation accuracy of the HMD 200 in the external PC 400. More specifically, the condition information includes a detection result report. In this embodiment, this detection result report includes the number of indices which are arranged in the physical space to detect the position and orientation of the HMD 200 and have been detected from the current measurement video. In this embodiment, the detection result report also includes the difference between the number of indices detected from the current measurement video and the number of indices detected from measurement video a predetermined time before.

The measurement accuracy determination unit 311 determines the position and orientation estimation accuracy of the HMD 200 by the external PC 400 using the detection result report obtained from a condition information reception unit 309. More specifically, the measurement accuracy determination unit 311 determines whether the position and orientation estimation accuracy of the HMD 200 is insufficient. More specifically, if the current number of detected indices is smaller than a threshold A1, the current index detection result is insufficient, and it can be determined that the position and orientation estimation accuracy of the HMD 200 is insufficient. In addition, if the current number of detected indices largely decreases as compared with the number of detected indices the predetermined time before, it can be determined that the position and orientation estimation accuracy of the HMD 200 is insufficient. For example, if a value obtained by subtracting the number of detected indices the predetermined time before from the current number of detected indices is smaller than a threshold B1, it can be determined that the current number of detected indices largely decreases.

The measurement accuracy determination unit 311 determines whether the position and orientation estimation accuracy of the HMD 200 is excessive. More specifically, if the number of detected indices continuously exceeds a threshold A2, the measurement accuracy determination unit 311 can determine that the position and orientation estimation accuracy of the HMD 200 is excessive. For example, if the current number of detected indices exceeds the threshold A2 and the value obtained by subtracting the number of detected indices the predetermined time before from the current number of detected indices exceeds a threshold B2, the measurement accuracy determination unit 311 can determine that the position and orientation estimation accuracy of the HMD 200 is excessive. In addition, if the code amount of the current measurement video exceeds a threshold, the measurement accuracy determination unit 311 can determine that the position and orientation estimation accuracy is excessive. Note that a position and orientation estimation accuracy determination method is not limited to this.

A method of controlling the code amounts of the compressed visual field video and measurement video by the code amount control unit 312 will be described below with reference to a flowchart shown in FIG. 17. Step S501 is the same as in the first embodiment but the condition information received in this embodiment includes information indicating the position and orientation estimation accuracy of the HMD 200 in the external PC 400. In step S503, the measurement accuracy determination unit 311 determines the position and orientation estimation accuracy of the HMD 200 by the external PC 400, as described above.

In step S504, the code amount control unit 312 determines whether the code amount of the measurement video is insufficient. More specifically, if the measurement accuracy determination unit 311 determines that the position and orientation estimation accuracy is insufficient, the code amount control unit 312 determines that the code amount of the measurement video is in short. If the code amount of the measurement video is in short, the process advances to step S507; otherwise, the process advances to step S516.

In step S507, the code amount control unit 312 increases the code amount of the measurement video. For example, the code amount control unit 312 can increase the code amount of the measurement video by a fixed value. On the other hand, the code amount control unit 312 may control the increase amount of the code amount in accordance with the shortage of the code amount or the number of detected indices. For example, the increase amount can be controlled so that the increase amount becomes larger as the current number of detected indices is smaller. In step S509, the code amount control unit 312 decreases the code amount of the visual field video. For example, the code amount control unit 312 can decrease the code amount of the visual field video by a fixed value.

In step S516, the code amount control unit 312 determines whether the code amount of the measurement video is excessive. More specifically, if the measurement accuracy determination unit 311 determines that the position and orientation estimation accuracy is excessive, the code amount control unit 312 determines that the code amount of the measurement video is excessive. If the code amount of the measurement video is excessive, the process advances to step S517; otherwise, the process ends.

In step S517, the code amount control unit 312 decreases the code amount of the measurement video. For example, the code amount control unit 312 can decrease the code amount of the measurement video by a fixed value. In step S518, the code amount control unit 312 increases the code amount of the visual field video. For example, the code amount control unit 312 can increase the code amount of the visual field video by a fixed value.

As described above, according to this embodiment, the code amount of the visual field video and that of the measurement video are controlled so that the ratio between the code amount of the visual field video and that of the measurement video changes in accordance with the position and orientation estimation accuracy of the HMD 200 using the measurement video. More specifically, if the position and orientation estimation accuracy is low, the code amounts are controlled so that the code amount of the measurement video becomes relatively large. By controlling the code amounts so that a code amount 603 of the measurement video suffices to estimate the position and orientation of the HMD 200, it is possible to reduce the possibility that estimation of the position and orientation of the HMD 200 fails. On the other hand, since it is possible to increase the code amount of the visual field video to be used to generate synthesized videos as much as possible, the quality of the synthesized videos can be improved.

In this embodiment, the usable communication bandwidth is fixed. However, in another embodiment, the usable communication bandwidth may vary. In this case, in step S509 or S518, the code amount control unit 312 can set the code amount of the visual field video in accordance with the usable communication bandwidth.

Third Embodiment

In the third embodiment, by combining the first and second embodiments, the code amounts (transmission rates) of visual field video and measurement video are controlled based on a communication bandwidth usable for data transmission from an HMD 200 to an external PC 400 and the position and orientation estimation accuracy of the HMD 200 using the measurement video. The arrangements of the HMD 200 and the external PC 400 are the same as in the first embodiment except that the HMD 200 includes both a bandwidth determination unit 310 and a measurement accuracy determination unit 311, and a detailed description thereof will be omitted.

FIGS. 8A and 8B are flowcharts illustrating a method of controlling the code amounts of compressed visual field video and measurement video by a code amount control unit 312. In step S501, a condition information reception unit 309 receives condition information from the external PC 400. The condition information includes a communication status report described in the first embodiment and a detection result report described in the second embodiment. Step S502 is executed in the same manner as in the first embodiment. Step S503 is executed in the same manner as in the second embodiment.

Step S504 is performed in the same manner as in the second embodiment. If the code amount of the measurement video is in short, the process advances to step S507; otherwise, the process advances to step S505. Step S507 is executed in the same manner as in the second embodiment. In step S508, the code amount control unit 312 determines whether a communication bandwidth is in short. This processing can be performed in the same manner as in step S505 of the first embodiment. If the communication bandwidth is in short, the process advances to step S509; otherwise, the process ends.

In step S509, the code amount control unit 312 decreases the code amount of the visual field video. For example, the code amount control unit 312 can decrease the code amount of the measurement video by a fixed value. The code amount control unit 312 can also decrease the code amount of the visual field video by the difference between the communication bandwidth calculated in step S502 and the total code amount of the current visual field video and measurement video.

Steps S505 and S506 are executed in the same manner as in the first embodiment. In step S510, the code amount control unit 312 determines whether there is an excess of the code amount of the current measurement video. For example, if the position and orientation estimation accuracy of the HMD 200 is sufficiently high, it can be determined that there is an excess of the code amount of the current measurement video. As a practical example, if the difference between the current number of detected indices and a threshold A1 is equal to or larger than a predetermined value, it can be determined that there is an excess of the code amount of the current measurement video. However, a method of determining whether there is an excess is not limited to this. For example, if the measurement accuracy determination unit 311 determines that the position and orientation estimation accuracy of the HMD 200 is excessive, the code amount control unit 312 may determine that there is an excess of the code amount of the current measurement video. If there is an excess of the code amount of the current measurement video, the process advances to step S511; otherwise, the process advances to step S512. Steps S511 to S513 are executed in the same manner as in the first embodiment.

As described above, if it is determined in step S504 that the position and orientation estimation accuracy is lower than a threshold and it is determined in step S508 that the communication bandwidth has become narrow, the code amount control unit 312 decreases the code amount of the visual field video in step S509. If it is determined in step S505 that the communication bandwidth has become narrow, and it is determined in step S510 that the position and orientation estimation accuracy exceeds a threshold, the code amount control unit 312 decreases the code amount of the measurement video in step S511.

FIG. 6 is a timing chart showing an example of code amount control according to this embodiment during a period from time T0 to time T8. In FIG. 6, the abscissa represents the time and the ordinate represents the communication bandwidth/code amount. A usable communication bandwidth 601, a code amount 602 of the visual field video, a code amount 603 of the measurement video, and a target code amount 604 are the same as in FIG. 7.

At time T0, the HMD 200 receives the condition information from the external PC 400 for the first time after the start of an operation, and grasps the usable communication bandwidth. At time T0, preset initial values are used as the code amounts of the visual field video and measurement video, and there is an excess of the current communication bandwidth. Furthermore, the code amount 603 of the measurement video is not short and the code amount 602 of the visual field video has not reached the target code amount 604. Therefore, in step S514, the code amount control unit 312 increases the code amount 602 of the visual field video by the fixed value. This processing is repeated until time T1.

At time T1, since the total code amount of the visual field video and measurement video reaches the usable bandwidth, it is determined in step S506 that there is no excess of the communication bandwidth, and the code amounts of the visual field video and measurement video are maintained. This processing is repeated until time T2.

During a period from time T2 to time T4, the usable communication bandwidth decreases. In a section from time T2 to time T3, the code amount control unit 312 decreases, in step S511, the code amount 603 of the measurement video in accordance with the decrease in communication bandwidth. At time T3, it is determined that there is no excess of the code amount 603 of the measurement video. Thus, in a section from time T3 to time T4, the code amount control unit 312 decreases, in step S512, the code amount 602 of the visual field video in accordance with the decrease in communication bandwidth.

During a period from time T4 to time T6, the usable communication bandwidth does not vary. In a section from time T4 to time T5, it is determined in step S506 that there is no excess of the communication bandwidth, and the code amounts of the visual field video and the measurement video are maintained. At time T5, it is determined that the code amount 603 of the measurement video is short. Therefore, the code amount control unit 312 increases the code amount 603 of the measurement video in step S507, and accordingly decreases the code amount 602 of the visual field video in step S509. For example, if a user 101 wearing the HMD 200 moves, and the distance between the HMD 200 and an index becomes long or the number of indices within the imaging range of the HMD 200 decreases, the position and orientation estimation accuracy of the HMD 200 becomes lower. In this case, it is necessary to correctly detect indices from the measurement video to keep the position and orientation estimation accuracy. Therefore, this means that the code amount of the compressed measurement video necessary to keep the position and orientation estimation accuracy has increased. The code amount of the measurement video necessary to keep the position and orientation estimation accuracy is a code amount 605 at time T3 but increases to a code amount 606 at time T5. In a section from time T5 to time T6, it is determined in step S506 that there is no excess of the communication bandwidth, and the code amounts of the visual field video and measurement video are maintained.

During a period from time T6 to time T8, the usable communication bandwidth widens. In a section from time T6 to time T7, the code amount control unit 312 increases, in step S514, the code amount 602 of the visual field video in accordance with the increase in communication bandwidth. At time T7, it is determined in step S513 that the code amount 602 of the visual field video reaches the target code amount 604. Therefore, in a section from time T7 to time T8, the code amount control unit 312 increases, in step S515, the code amount 603 of the measurement video in accordance with the increase in communication bandwidth. At time T8, the total code amount of the visual field video and measurement video reaches the usable communication bandwidth. After time T8, the usable communication bandwidth does not vary. Therefore, it is determined in step S506 that there is no excess of the communication bandwidth, and the code amounts of the visual field video and measurement video are maintained.

Fourth Embodiment

In the first and second embodiments, the code amounts of the visual field video and measurement video are controlled in accordance with the communication bandwidth or the position and orientation estimation accuracy. However, the code amounts can be controlled based on other information. In the fourth embodiment, based on the moving amount of an HMD 200, the size of a CG region occupying each synthesized video, or a user setting, the code amounts of visual field video and measurement video are controlled so that the ratio between the code amount of the visual field video and that of the measurement video changes. More specifically, if it is necessary to increase the code amount of the measurement video to more correctly estimate the position and orientation of the HMD 200 in consideration of the position and orientation estimation accuracy or the moving amount of the HMD 200, the code amount of the measurement video is relatively increased. In this way, the code amounts can be controlled so that a code amount 603 of the measurement video is enough to estimate the position and orientation of the HMD 200. If it is acceptable to decrease the quality of the visual field video, the code amount of the measurement video is relatively increased in consideration of the moving amount of the HMD 200, the size of the CG region occupying each synthesized video, or the user setting.

The configuration of an MR system according to this embodiment is the same as in the first embodiment and a description thereof will be omitted. The hardware arrangement of the HMD 200 according to this embodiment is the same as in the first embodiment except that an inertial sensor is included. An inertial sensor 801 periodically measures the moving amount of the HMD 200 at a predetermined sampling frequency. The moving amount includes at least one of a translation amount and rotation amount. The inertial sensor 801 can be a gyro sensor, an acceleration sensor, or both of them. The moving amount of the HMD 200 may be estimated by an external PC 400 using measurement video, as a matter of course. In this case, the HMD 200 can obtain, as condition information, information indicating the moving amount of the HMD 200.

FIG. 9 is a block diagram showing the module arrangement of the HMD 200 according to this embodiment. The same reference numerals as in FIG. 3 denote the same modules as those of the HMD 200 according to the first embodiment and a repetitive description thereof will be omitted.

A condition information reception unit 309 receives, as condition information, a CG region report in addition to a communication status report described in the first embodiment and a detection result report described in the second embodiment. The CG region report includes information indicating the size of a region, on which a CG image is superimposed, in each synthesized video or the ratio of the region to the synthesized video. A CG size obtaining unit 901 obtains, from the CG region report received by the condition information reception unit 309, information indicating the size of the region, on which the CG image is superimposed, in the synthesized video or the ratio of the region to the synthesized video.

A moving amount obtaining unit 902 controls the inertial sensor 801 to obtain moving amount information of the HMD 200. A user selection obtaining unit 903 obtains information indicating a priority mode selected by the user wearing the HMD 200. In this embodiment, the priority mode includes an image quality priority mode of prioritizing the visual field video and a motion priority mode of prioritizing the measurement video.

A weight setting unit 904 sets weights for the visual field video and measurement video. A practical weight setting method will be described later. In another embodiment, a weight is set for the visual field video or measurement video. For example, if a weight is set for only the measurement video, the weight of the measurement video is decreased instead of increasing the weight of the visual field video, or the weight of the measurement video is increased instead of decreasing the weight of the visual field video. In this way, a weight can be set for at least the visual field video or measurement video.

A code amount control unit 312 determines the code amounts of the visual field video and measurement video with reference to a usable communication bandwidth determined by a bandwidth determination unit 310 and the weights of the visual field video and measurement video set by the weight setting unit 904. A practical determination method will be described later.

FIG. 10 is a flowchart illustrating a method of controlling the code amounts of the compressed visual field video and measurement video by the code amount control unit 312. At the start of processing shown in FIG. 10, for example, appropriate initial values shown in FIG. 15 are set as the weights of the visual field video and measurement video. In step S1001, the condition information reception unit 309 receives the condition information from the external PC 400.

In step S1100, the weight setting unit 904 adjusts the weights of the visual field video and measurement video in accordance with the position and orientation estimation accuracy of the HMD 200 obtained from the condition information, more specifically, the index detection result. As a result of the weight adjustment, the code amounts (transmission rates) of the visual field video and measurement video are controlled so that the transmission rate ratio between the visual field video and the measurement video changes in accordance with the position and orientation estimation accuracy. More specifically, if the position and orientation estimation accuracy is lower than a threshold, the weight setting unit 904 increases the weight of the measurement video to relatively increase the code amount of the measurement video. Practical processing will be described later with reference to FIG. 11.

In step S1200, the weight setting unit 904 adjusts the weights of the visual field video and measurement video in accordance with the moving amount of the HMD 200 obtained from the moving amount obtaining unit 902. As a result of the weight adjustment, the code amounts (transmission rates) of the visual field video and measurement video are controlled so that the transmission rate ratio between the visual field video and the measurement video changes in accordance with the moving amount of the HMD 200. More specifically, if the moving amount of the HMD 200 is larger than a threshold, the weight setting unit 904 increases the weight of the measurement video to relatively increase the code amount of the measurement video. Practical processing will be described later with reference to FIG. 12.

In step S1300, the weight setting unit 904 adjusts the weights of the visual field video and measurement video in accordance with the size of the CG region occupying each synthesized video, which is obtained from the condition information. As a result of the weight adjustment, the code amounts (transmission rates) of the visual field video and measurement video are controlled so that the transmission rate ratio between the visual field video and the measurement video changes in accordance with the size of the CG region. More specifically, if the size of the CG region is larger than a threshold, the weight setting unit 904 decreases the weight of the visual field video (increases the weight of the measurement video) to relatively increase the code amount of the measurement video. Practical processing will be described later with reference to FIG. 13.

In step S1400, the weight setting unit 904 adjusts the weights of the visual field video and measurement video in accordance with the information indicating the priority mode obtained from the user selection obtaining unit 903. That is, the code amounts (transmission rates) of the visual field video and measurement video are controlled so that the transmission rate ratio between the visual field video and the measurement video changes in response to user designation. Practical processing will be described later with reference to FIG. 14.

In step S1002, the bandwidth determination unit 310 calculates a communication bandwidth usable for data transmission from the HMD 200 to the external PC 400 with reference to the condition information, similarly to step S502.

In steps S1003 and S1004, the code amount control unit 312 sets the code amounts of the visual field video and measurement video in accordance with the weights of the visual field video and measurement video adjusted in steps S1100 to S1400. As a practical example, in step AS1003, the code amount control unit 312 determines the code amount of the visual field video by:

code amount of visual field video=communication bandwidth×(weight of visual field video/(weight of visual field video+weight of measurement video))

In step S1004, the code amount control unit 312 determines the code amount of the measurement video by:

code amount of measurement video=communication bandwidth−code amount of visual field video In steps S1003 and S1004, the code amounts are determined so as to use the entire usable communication bandwidth. However, it is not essential to use the entire communication bandwidth, and the code amounts can be determined so as to use part, for example, 90% of the communication bandwidth. The above code amount determination method is merely an example, and the present invention is not limited to this. For example, in step S1003, if the code amount of the visual field video exceeds the target code amount, the code amount control unit 312 may set the code amount of the visual field video to be equal to the target code amount.

More detailed processing in step S1100 will be described with reference to a flowchart shown in FIG. 11. In step S1101, the measurement accuracy determination unit 311 determines the position and orientation estimation accuracy of the HMD 200 by the external PC 400, similarly to step S503. In step S1102, the weight setting unit 904 determines whether the code amount of the measurement video is short, similarly to step S504. If the code amount of the measurement video is short, the process advances to step S1103; otherwise, the process advances to step S1104.

In step S1103, the weight setting unit 904 increases the weight of the measurement video. The weight setting unit 904 may increase the weight of the measurement video by a fixed value, or increase the weight of the measurement video by a value which is set to become larger as the code amount of the measurement video is shorter. The processing shown in FIG. 11 ends.

In step S1104, the weight setting unit 904 determines whether the code amount of the measurement video is excessive. Whether the code amount of the measurement video is excessive can be determined, similarly to step S516. In this embodiment, even if the ratio (weight of measurement video/weight of visual field video) exceeds a threshold, it can be determined that the code amount of the measurement video is excessive. If the code amount of the measurement video is excessive, the process advances to step S1105; otherwise, the processing shown in FIG. 11 ends.

In step S1105, the weight setting unit 904 decreases the weight of the measurement video. The weight setting unit 904 may decrease the weight of the measurement video by a fixed value, or decrease the weight of the measurement video by a value which is set to become larger as the code amount of the measurement video is more excessive. The processing shown in FIG. 11 ends.

More detailed processing in step S1200 will be described with reference to a flowchart shown in FIG. 12. In step S1201, the moving amount obtaining unit 902 obtains the moving amount information of the HMD 200. In this embodiment, the moving amount information is a numerical value obtained by weighting and adding the current translation amount and rotation amount per unit time of the HMD 200. However, the moving amount information can be other information indicating the current moving amount or moving speed of the HMD 200.

In step S1202, the weight setting unit 904 determines whether the moving amount obtained in step S1201 exceeds a threshold. If the moving amount exceeds the threshold, the process proceeds to step S1203; otherwise the process proceeds to step S1207.

In step S1203, the weight setting unit 904 determines whether a moving flag is ON. The moving flag is a flag indicating that the HMD 200 currently largely moves and the weight of the measurement video has been increased, and is managed in the HMD 200. If the moving flag is ON, the process ends; otherwise, the process proceeds to step S1204.

In step S1204, the weight setting unit 904 increases the weight of the measurement video. If the HMD 200 largely moves, a large code amount is necessary to maintain the image quality of the video captured by the HMD 200, as compared with a case in which the HMD 200 stays still. Since the code amount of the measurement video becomes relatively large by increasing the weight of the measurement video, it is possible to maintain the image quality of the measurement video transmitted to the external PC 400.

In step S1205, the weight setting unit 904 decreases the weight of the visual field video. If the HMD 200 largely moves, it becomes difficult for the user wearing the HMD 200 to perceive deterioration of the image quality of the synthesized videos output by the HMD 200, as compared with a case in which the HMD 200 stays still. Therefore, even if the image quality of the visual field video is degraded, it is difficult to impair the user experience of the MR system.

The increase amount and decrease amount of the weight in steps S1204 and S1205 may be fixed values, or values determined in accordance with the moving amount obtained in step S1201. For example, the weight setting unit 904 can dynamically change the increase amount and decrease amount of the weight in accordance with the difference value between the threshold and the moving amount used in step S1202 so that, for example, the increase amount and decrease amount become larger as the difference value is larger. In step S1206, the weight setting unit 904 turns on the moving flag. After that, the process ends.

In step S1207, the weight setting unit 904 determines whether the moving flag is ON. If the moving flag is ON, the process proceeds to step S1208; otherwise, the process ends.

In step S1208, the weight setting unit 904 decreases the weight of the measurement video. The decrease amount of the weight can be equal to, for example, the increase amount of the weight in latest step S1204. In step S1209, the weight setting unit 904 increases the weight of the visual field video. The increase amount of the weight can be equal to, for example, the decrease amount in latest step S1205. In step S1210, the weight setting unit 904 turns off the moving flag. After that, the process ends.

More detailed processing in step S1300 will be described with reference to a flowchart shown in FIG. 13. In step S1301, the CG size obtaining unit 901 obtains the size (to be referred to as a CG size hereinafter) of a region, on which a CG image is superimposed, in each synthesized video. In step S1302, the weight setting unit 904 determines whether the CG size exceeds a threshold. If the CG size exceeds the threshold, the process proceeds to step S1303; otherwise, the process proceeds to step S1306.

In step S1303, the weight setting unit 904 determines whether a CG flag is ON. The CG flag is a flag indicating that the CG size is large and the weight of the visual field video has thus been decreased, and is managed in the HMD 200. If the CG flag is ON, the process ends; otherwise, the process proceeds to step S1304.

In step S1304, the weight setting unit 904 decreases the weight of the visual field video. If the CG size is large, a region of each synthesized video, in which each visual field video occupies, is small. Therefore, even if the image quality of the visual field video deteriorates, it is difficult to impair the user experience of the MR system. The decrease amount of the weight may be a fixed value, or a value determined in accordance with the CG size obtained in step S1301. For example, the weight setting unit 904 can dynamically change the decrease amount of the weight in accordance with the ratio of the CG region to the entire synthesized video so that, for example, the decrease amount becomes larger as the ratio of the CG region to the entire synthesized video is higher. In step S1305, the weight setting unit 904 turns on the CG flag. After that, the process ends.

In step S1306, the weight setting unit 904 determines whether the CG flag is ON. If the CG flag is ON, the process proceeds to step S1307; otherwise, the process ends.

In step S1307, the weight setting unit 904 increases the weight of the visual field video. The increase amount of the weight can be equal to, for example, the decrease amount of the weight in latest step S1304. In step S1308, the weight setting unit 904 turns off the CG flag. After that, the process ends.

More detailed processing in step S1400 will be described with reference to a flowchart shown in FIG. 14. In step S1401, the user selection obtaining unit 903 obtains the information indicating the priority mode selected by the user. In step S1402, the weight setting unit 904 determines whether the priority mode is the image quality priority mode. If the user has selected the image quality priority mode, the process proceeds to step S1403; otherwise, the process proceeds to step S1409.

In step S1403, the weight setting unit 904 determines whether an image quality priority flag is ON. The image quality priority flag is a flag indicating that the image quality priority mode has been selected and the weight of the visual field video has thus been increased, and is managed in the HMD 200. If the image quality priority flag is ON, the process ends; otherwise, the process proceeds to step S1404.

In step S1404, the weight setting unit 904 increases the weight of the measurement video. In step S1405, the weight setting unit 904 turns on the image quality priority flag. In step S1406, the weight setting unit 904 determines whether a motion priority flag is ON. The motion priority flag is a flag indicating that the motion priority has been selected and the weight of the measurement video has thus been increased, and is managed in the HMD 200. If the motion priority flag is ON, the process proceeds to step S1407; otherwise, the process ends. In step S1407, the weight setting unit 904 decreases the weight of the measurement video. In step S1408, the weight setting unit 904 turns off the motion priority flag. After that, the process ends.

In step S1409, the weight setting unit 904 determines whether the priority mode is the motion priority mode. If the user has selected the motion priority mode, the process proceeds to step S1410; otherwise, the process ends. In step S1410, the weight setting unit 904 determines whether the motion priority flag is ON. If the motion priority flag is ON, the process ends; otherwise, the process proceeds to step S1411.

In step S1411, the weight setting unit 904 increases the weight of the measurement video. In step S1412, the weight setting unit 904 turns on the motion priority flag. In step S1413, the weight setting unit 904 determines whether the image quality priority flag is ON. If the image quality priority flag is ON, the process proceeds to step S1414; otherwise, the process ends. In step S1414, the weight setting unit 904 decreases the weight of the measurement video. In step S1415, the weight setting unit 904 turns off the image quality priority flag. After that, the process ends.

In step S1404 or S1411, the increase amount of the weight may be a fixed value. The user may be able to set an image quality or motion priority level. In this case, the weight setting unit 904 can use, as the increase amount of the weight, a value corresponding to the priority level. In step S1407 or S1414, the decrease amount of the weight can be equal to the increase amount of the weight in latest step S1404 or S1411.

FIG. 15 shows examples of the increase amount and decrease amount used when the initial values of the weights of the visual field video and measurement video and the increase amounts and decrease amounts of the weights of the visual field video and measurement video are fixed values. Values shown in FIG. 15 are merely examples and the present invention is not limited to them.

FIG. 16 is a timing chart showing a practical example of code amount control according to this embodiment during a period from time T0 to time T12. The abscissa represents the time and the ordinate represents the communication bandwidth/code amount. A usable communication bandwidth 1601, a code amount 1602 of the visual field video, and a code amount 1603 of the measurement video are the same as those denoted by reference numerals 601 to 603 in FIG. 6. A maximum code amount 1604 indicates the preset maximum code amount of the measurement video. If the code amount 1603 of the measurement video exceeds the maximum code amount 1604, it is determined in step S1104 that the code amount is excessive, and the code amount 1603 of the measurement video is decreased in step S1105.

At time T0, the HMD 200 receives the condition information from the external PC 400 for the first time after the start of an operation, and grasps the usable communication bandwidth. At time T0, an initial value of 100 is used as the code amount of the visual field video, and an initial value of 50 is used as the code amount of the measurement video.

In a section from time T1 to time T2, a user 101 wearing the HMD 200 moves, and the moving amount of the HMD 200 exceeds the threshold. Therefore, the weight setting unit 904 adjusts the weights in step S1200. More specifically, the weight of the measurement video is increased by 10 to 60 in step S1204, and the weight of the visual field video is decreased by 10 to 90 in step S1205. At time T2, the user 101 wearing the HMD 200 stops, and the moving amount of the HMD 200 is smaller than the threshold. Therefore, the weight of the measurement video is decreased by 10 to 50 in step S1208, and the weight of the visual field video is increased by 10 to 100 in step S1209.

In a section from time T3 to time T5, the usable communication bandwidth decreases. At time T4, it is determined that the position and orientation estimation accuracy of the HMD 200 is insufficient. Thus, in step S1100, the weight setting unit 904 adjusts the weights. More specifically, in step S1103, the weight of the measurement video is increased by 20 to 70. In a section from time T5 to time T7, the usable communication bandwidth does not vary.

In a section from time T6 to time T8, the CG size becomes larger than the threshold. Thus, in step S1300, the weight setting unit 904 adjusts the weights. More specifically, in step S1304, the weight of the visual field video is decreased by 20 to 80. The weight of the measurement video does not change and remains 70.

In a section from time T7 to time T11, the usable communication bandwidth widens. At time T8, the CG size becomes smaller than the threshold. Thus, in step S1300, the weight setting unit 904 adjusts the weights. More specifically, in step S1307, the weight of the visual field video is increased by 20 to 100. The weight of the measurement video does not change and remains 70.

At time T9, the code amount of the measurement video reaches the maximum code amount 1604. Thus, in step S1100, the weight setting unit 904 adjusts the weights. More specifically, in step S1105, the weight of the measurement video is decreased by 10 to 60. The weight of the visual field video does not change and remains 100. At time T10, the code amount of the measurement video reaches the maximum code amount 1604 again. Thus, in step S1100, the weight setting unit 904 adjusts the weights. More specifically, in step S1105, the weight of the measurement video is decreased by 10 to 50. The weight of the visual field video does not change and remains 100.

After time T11, the usable communication bandwidth does not vary. At time T12, the user 101 selects the image quality priority mode. Thus, in step S1400, the weight setting unit 904 adjusts the weights. More specifically, in step S1404, the weight of the visual field video is increased by 30 to 130. The weight of the measurement video does not change and remains 50.

As described above, according to this embodiment, the code amounts of the visual field video and measurement video are controlled in consideration of the position and orientation estimation accuracy (S1100), the moving amount of the HMD 200 (S1200), the size of the CG region included in each synthesized video (S1300), and the user setting (S1400). More specifically, the weights of the visual field video and measurement video are determined with reference to the pieces of information. Based on the determined weights, the ratio between the code amount of the visual field video and that of the measurement video is determined. However, it is not necessary to consider all the pieces of information, and the code amounts can be controlled by combining one or more arbitrary pieces of information. That is, among the processes in steps S1100 to S1400, processing using the information which is not taken into consideration can be eliminated. Furthermore, among the components shown in FIGS. 3 and 9, a component for obtaining the information which is not taken into consideration can be eliminated.

The code amounts can also be controlled in consideration of other information in addition to or instead of the pieces of information. For example, if the code amount of the visual field video has reached the target code amount, the weight setting unit 904 may decrease the weight of the visual field video (or increase the weight of the measurement video).

It is not essential to control the weights of the visual field video and measurement video in accordance with the pieces of information. For example, similarly to the first to third embodiments, if a predetermined condition is satisfied, the code amount of the visual field video or measurement video may be increased or decreased. As a practical example, if the moving amount of the HMD 200 is larger than the threshold, the code amount of the measurement video can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer rexecutable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-088770, filed Apr. 23, 2015, which is hereby incorporated by reference herein in its entirety.

The invention claimed is:

1. A transmission apparatus for transmitting, to a reception apparatus, first video captured by an imaging apparatus and second video captured to detect a position and orientation of the imaging apparatus when capturing the first video, comprising:
a memory containing instructions; and
at least one processor for executing the instructions, the instructions being executed to operate as
a control unit configured to control a transmission rate of the first video and a transmission rate of the second video so that a transmission rate ratio between the first video and the second video changes; and
a transmission unit configured to transmit the first video and the second video to the reception apparatus in accordance with the controlled transmission rates,
wherein:
if a communication bandwidth between the transmission apparatus and the reception apparatus is smaller than a sum of a first setting value and a second setting value, the control unit controls the transmission rate of the first video to be smaller than the first setting value, and controls the transmission rate of the second video to be equal to the second setting value; and
if the communication bandwidth exceeds the sum of the first setting value and the second setting value, the control unit controls the transmission rate of the first video to be equal to the first setting value, and controls the transmission rate of the second video to exceed the second setting value.

2. The transmission apparatus according to claim 1, further executing the instructions to operate as a bandwidth determination unit configured to determine the communication bandwidth in accordance with condition information which has been received from the reception apparatus,
wherein the condition information includes at least one of:
a communication error rate and delay information in data transmission from the transmission apparatus to the reception apparatus; or
information about a bandwidth usable for data transmission from the transmission apparatus to the reception apparatus.

3. The transmission apparatus according to claim 1, wherein the control unit is further configured to control the transmission rates of the first video and the second video so that the transmission rate ratio between the first video and the second video changes in accordance with information which has been transmitted from the reception apparatus and indicates estimation accuracy of the position and orientation of the imaging apparatus using the second video.

4. The transmission apparatus according to claim 3, wherein the information indicating the estimation accuracy of the position and orientation of the imaging apparatus includes the number of indices which are arranged in a physical space and have been detected from the second video to detect the position and orientation of the imaging apparatus.

5. The transmission apparatus according to claim 3, wherein the information indicating the estimation accuracy of the position and orientation of the imaging apparatus includes a difference between the number of indices detected from the current second video and the number of indices detected from the second video a predetermined time before.

6. The transmission apparatus according to claim 1, wherein the control unit is further configured to control the transmission rates of the first video and the second video so that the transmission rate ratio between the first video and the second video changes in accordance with a moving amount of the imaging apparatus.

7. The transmission apparatus according to claim 1, wherein:
the reception apparatus generates a synthesized video by synthesizing the first video and a superimposing image generated in accordance with the position and orientation of the imaging apparatus detected using the second video; and
the control unit is further configured to control the transmission rates of the first video and the second video so that the transmission rate ratio between the first video and the second video changes in accordance with a size of the superimposing image occupying the synthesized video.

8. The transmission apparatus according to claim 1, wherein:
the reception apparatus generates a synthesized video by synthesizing the first video and a superimposing image generated in accordance with the position and orientation of the imaging apparatus detected using the second video; and
the control unit is further configured to control the transmission rates of the first video and the second video in accordance with a weight of the second video determined through at least one of:
increasing the weight of the second video if estimation accuracy of the position and orientation of the imaging apparatus using the second video, which is obtained in accordance with information transmitted from the reception apparatus, is lower than a threshold;
increasing the weight of the second video if a moving amount of the imaging apparatus is larger than a threshold; or
increasing the weight of the second video if a size of the superimposing image occupying the synthesized video is larger than the threshold.

9. The transmission apparatus according to claim 8, wherein the control unit is further configured to determine the weight of the second video further through at least one of:
increasing the weight of the second video in response to user designation; or
increasing the weight of the second video if the transmission rate of the first video has reached a target.

10. A transmission apparatus for transmitting, to a reception apparatus, first video captured by an imaging apparatus and second video captured to detect a position and orientation of the imaging apparatus when capturing the first video, comprising:
a memory containing instructions; and
at least one processor for executing the instructions, the instructions being executed to operate as
a bandwidth determination unit configured to determine a communication bandwidth between the transmission apparatus and the reception apparatus;
an accuracy determination unit configured to determine, using condition information received from the reception apparatus, estimation accuracy of the position and orientation of the imaging apparatus using the second video;

a control unit configured to determine transmission rates of the first video and the second video in response to determining that the communication bandwidth has become narrow, and decrease the transmission rate of the second video in response to determining that the estimation accuracy exceeds a threshold and decrease the transmission rate of the first video in response to determining that the estimation accuracy is lower than the threshold;

a first compression unit configured to compress the first video in accordance with the determined transmission rate;

a second compression unit configured to compress the second video in accordance with the determined transmission rate; and a transmission unit configured to transmit the compressed first video and the compressed second video to the reception apparatus.

11. A transmission apparatus for transmitting, to a reception apparatus, first video captured by an imaging apparatus and second video captured to detect a position and orientation of the imaging apparatus when capturing the first video, comprising:

a memory containing instructions; and at least one processor for executing the instructions, the instructions being executed to operate as a bandwidth determination unit configured to determine a communication bandwidth between the transmission apparatus and the reception apparatus;

a control unit configured to determine, in response to determining that the communication bandwidth has become narrow, transmission rates of the first video and the second video, and decrease the transmission rate of the second video in response to determining that the current transmission rate of the second video exceeds a threshold and decrease the transmission rate of the first video in response to determining that the current transmission rate of the second video is not higher than the threshold;

a first compression unit configured to compress the first video in accordance with the determined transmission rate;

a second compression unit configured to compress the second video in accordance with the determined transmission rate; and a transmission unit configured to transmit the compressed first video and the compressed second video to the reception apparatus.

12. The transmission apparatus according to claim 1, wherein the transmission apparatus is a head mounted display, and the transmission apparatus further comprises:

an imaging apparatus including a first camera which captures the first video and a second camera which captures the second video; and the instructions are further executed to operate as a reception unit configured to receive a synthesized video generated by synthesizing the first video and a superimposing image generated in accordance with the position and orientation of the imaging apparatus detected using the second video; and a presentation unit configured to present the synthesized video to a user.

13. A mixed reality system comprising:

a transmission apparatus according to claim 12; and an external apparatus configured to receive first video and second video, generate a synthesized video by synthesizing the first video and a superimposing image generated in accordance with a position and orientation of an imaging apparatus detected using the second video, and transmit the synthesized video to the transmission apparatus.

14. A transmission method comprising:

controlling a transmission rate of first video and a transmission rate of second video so that a transmission rate ratio between the first video and the second video changes, wherein the first video is captured by an imaging apparatus and the second video is captured to detect a position and orientation of the imaging apparatus when capturing the first video; and transmitting the first video and the second video to a reception apparatus in accordance with the controlled transmission rates, wherein:

if a communication bandwidth between a transmission apparatus and the reception apparatus is smaller than a sum of a first setting value and a second setting value, the transmission rate of the first video is controlled to be smaller than the first setting value, and the transmission rate of the second video is controlled to be equal to the second setting value; and if the communication bandwidth exceeds the sum of the first setting value and the second setting value, the transmission rate of the first video is controlled to be equal to the first setting value, and the transmission rate of the second video is controlled to exceed the second setting value.

15. A non-transitory computer-readable medium storing a program comprising instructions for causing a computer to perform a method comprising:

controlling a transmission rate of first video and a transmission rate of second video so that a transmission rate ratio between the first video and the second video changes, wherein the first video is captured by an imaging apparatus and the second video is captured to detect a position and orientation of the imaging apparatus when capturing the first video; and transmitting the first video and the second video to a reception apparatus in accordance with the controlled transmission rates, wherein:

if a communication bandwidth between a transmission apparatus and the reception apparatus is smaller than a sum of a first setting value and a second setting value, the transmission rate of the first video is controlled to be smaller than the first setting value, and the transmission rate of the second video is controlled to be equal to the second setting value; and if the communication bandwidth exceeds the sum of the first setting value and the second setting value, the transmission rate of the first video is controlled to be equal to the first setting value, and the transmission rate of the second video is controlled to exceed the second setting value.

* * * * *